(12) United States Patent
Wada

(10) Patent No.: US 8,149,515 B2
(45) Date of Patent: Apr. 3, 2012

(54) ZOOM LENS AND IMAGE PICKUP APPARATUS WITH THE SAME

(75) Inventor: Ken Wada, Sakura (JP)

(73) Assignee: Canon Kabushiki Kaisha (JP)

( * ) Notice: Subject to any disclaimer, the term of this patent is extended or adjusted under 35 U.S.C. 154(b) by 120 days.

(21) Appl. No.: 12/827,233

(22) Filed: Jun. 30, 2010

(65) Prior Publication Data

US 2010/0328783 A1 Dec. 30, 2010

(30) Foreign Application Priority Data

Jun. 30, 2009 (JP) ................................. 2009-155081

(51) Int. Cl.
*G02B 15/14* (2006.01)
*G02B 17/00* (2006.01)
(52) U.S. Cl. .......................... 359/683; 359/687; 359/726
(58) Field of Classification Search .................. 359/683, 359/687, 726
See application file for complete search history.

(56) References Cited

U.S. PATENT DOCUMENTS

| 7,023,624 | B2 | 4/2006 | Nanba | |
|---|---|---|---|---|
| 7,688,519 | B2 * | 3/2010 | Ito | ................................. 359/683 |

FOREIGN PATENT DOCUMENTS

| JP | 2005-062228 A | 3/2005 |
|---|---|---|
| JP | 2007-292795 A | 11/2007 |
| JP | 2007-293051 A | 11/2007 |

* cited by examiner

*Primary Examiner* — William Choi
(74) *Attorney, Agent, or Firm* — Rossi, Kimms & McDowell LLP

(57) ABSTRACT

The zoom lens includes, in order from an object side, a first lens unit (positive), a second lens unit (negative), a reflective member and subsequent lens units. A distance between the second and subsequent lens units is reduced during zooming from a wide-angle end to a telephoto end. One of the subsequent lens units includes a non-shift lens unit and a shift lens unit shiftable for image stabilization. The conditions of $1<(1-\beta b)\beta r<3$ and $0.70<Lb/Lp<2.00$ are satisfied. $\beta b$ and $\beta r$ represent lateral magnifications of the shift lens unit and all lens units disposed further on the image side than the shift lens unit when the zoom lens is focused on an infinitely distant object at the telephoto end. Lb represents a distance from an image side surface of the reflective member to an object side lens surface of the shift lens unit. Lp represents a thickness of the reflective member.

6 Claims, 13 Drawing Sheets

ZOOM LENS AND IMAGE PICKUP APPARATUS WITH THE SAME

BACKGROUND OF THE INVENTION

1. Field of the Invention

The present invention relates to a zoom lens suitable for an image taking optical system used for an image pickup apparatus such as a video camera, a digital still camera, a broadcasting camera and a film camera.

2. Related Background Art

It is requested for image-taking optical systems used for image pickup apparatuses to have a high zoom ratio and a small size as a whole, and further to be capable of reducing a thickness of the image pickup apparatus. Moreover, it is demanded for the image-taking optical systems to have an image stabilization (image blur correction) function to prevent image blur caused by camera shaking.

Zoom lenses have been known each of which includes a reflective member such as a prism being disposed on an optical path and bending (turning) an optical axis of an image-taking optical system by 90 degrees (Japanese Patent Laid-Open Nos. 2007-293051 and 2007-292795).

Moreover, a zoom lens has been known which includes an image stabilization function and is constituted by, in order from an object side to an image side, a first lens unit having a positive refractive power, a second lens unit having a negative refractive power, a third lens unit having a positive refractive power and a fourth lens unit having a positive refractive power. In this zoom lens, part of the third lens unit is moved (shifted) in a direction orthogonal to an optical axis to perform image stabilization (U.S. Pat. No. 7,023,624).

The zoom lens disclosed in Japanese Patent Laid-Open No. 2007-293051 is constituted by, in order from the object side to the image side, a first lens unit having a positive refractive power, a second lens unit having a negative refractive power, a third lens unit having a positive refractive power, a fourth lens unit having a positive refractive power and a fifth lens unit having a positive refractive power, and includes the reflective member to bend the optical axis further on the image side than the second lens unit. In this zoom lens, the entire third lens unit is moved (shifted) in the direction orthogonal to the optical axis to perform the image stabilization.

The zoom lens disclosed in Japanese Patent Laid-Open No. 2007-292795 is constituted by, in order from the object side to the image side, a first lens unit having a positive refractive power, a second lens unit having a negative refractive power, a third lens unit having a positive refractive power and a fourth lens unit having a positive refractive power, and includes the reflective member to bend the optical axis in each of the first and third lens units. In this zoom lens, during zooming, the first and third lens units are fixed (unmoved), and the second and fourth lens units are moved in an optical axis direction. The third lens unit is divided into two partial lens units including an object side lens unit and an image side lens unit which are arranged on both sides of the reflective member. The object side lens unit is moved in the direction orthogonal to the optical axis to perform the image stabilization.

U.S. Pat. No. 7,023,624 discloses a lens configuration in which the third lens unit is divided into a first partial lens unit and a second partial lens unit each having a positive refractive power, and the second partial lens unit is moved in the direction orthogonal to the optical axis to perform the image stabilization.

Applying such a zoom lens including the reflective member to bend the optical axis and having the image stabilization function to an image pickup apparatus makes it easy to reduce the thickness of the image pickup apparatus and to obtain an image with no image blur. However, improper arrangement of the reflective member and the lens unit for the image stabilization makes it difficult to achieve the above-described effects.

For example, in a case of performing the image stabilization by shifting an image stabilizing lens unit adjacent to the reflective member (prism) bending the optical axis by 90 degrees, a large movement amount of a lens holding member holding the image stabilizing lens unit in the direction orthogonal to the optical axis may cause interference between the lens holding member and another lens holding member. Therefore, in a zoom lens in which a lens unit is disposed closely to the reflective member, it is important to appropriately set a configuration of the image stabilizing lens unit.

SUMMARY OF THE INVENTION

The present invention provides a zoom lens capable of reducing a thickness of an image pickup apparatus, increasing a drive amount of an image stabilizing lens unit and easily obtaining a good quality image.

The present invention provides as an aspect thereof a zoom lens including, in order from an object side to an image side, a first lens unit configured to have a positive refractive power, a second lens unit configured to have a negative refractive power, a reflective member configured to bend an optical axis, and subsequent lens units. A distance between the second lens unit and the subsequent lens units is reduced during zooming from a wide-angle end to a telephoto end. One of the subsequent lens units is configured to include, in order from the object side to the image side, a non-shift lens unit that is unmoved during image stabilization, and a shift lens unit that is moved in a direction including a directional component orthogonal to an optical axis direction to change an image-forming position in a direction orthogonal to the optical axis direction during the image stabilization. The following conditions are satisfied:

$$1<(1-\beta b)\beta r<3$$

$$0.70<Lb/Lp<2.00$$

where $\beta b$ and $\beta r$ respectively represent a lateral magnification of the shift lens unit and a lateral magnification of all lens units disposed further on the image side than the shift lens unit when the zoom lens is focused on an infinitely distant object at the telephoto end, Lb represents a distance from an image side surface of the reflective member to an object side lens surface of the shift lens when the zoom lens is focused on the infinitely distant object at the telephoto end, and Lp represents a thickness of the reflective member on the optical axis.

The present invention provides as another aspect thereof an image pickup element including the above-described zoom lens.

Other aspects of the present invention will become apparent from the following description and the attached drawings.

DETAILED DESCRIPTION OF THE PREFERRED EMBODIMENTS

Exemplary embodiments of the present invention will hereinafter be described with reference to the accompanying drawings.

A zoom lens of each embodiment of the present invention, which will be described below, includes in order from an object side to an image side, a first lens unit L1 configured to have a positive refractive power, a second lens unit L2 configured to have a negative refractive power, a reflective member PR configured to bend (or turn) an optical axis of the zoom lens by 90 degree or around 90 degrees (for example, within 90±10 degrees) such as a reflective mirror or prism, and subsequent lens units LR configured to include plural lens units disposed further on the image side than the reflective member PR. In the zoom lens, a distance between the second lens unit L2 and the subsequent lens units LR is reduced during zooming from a wide-angle end to a telephoto end.

Figure 1:
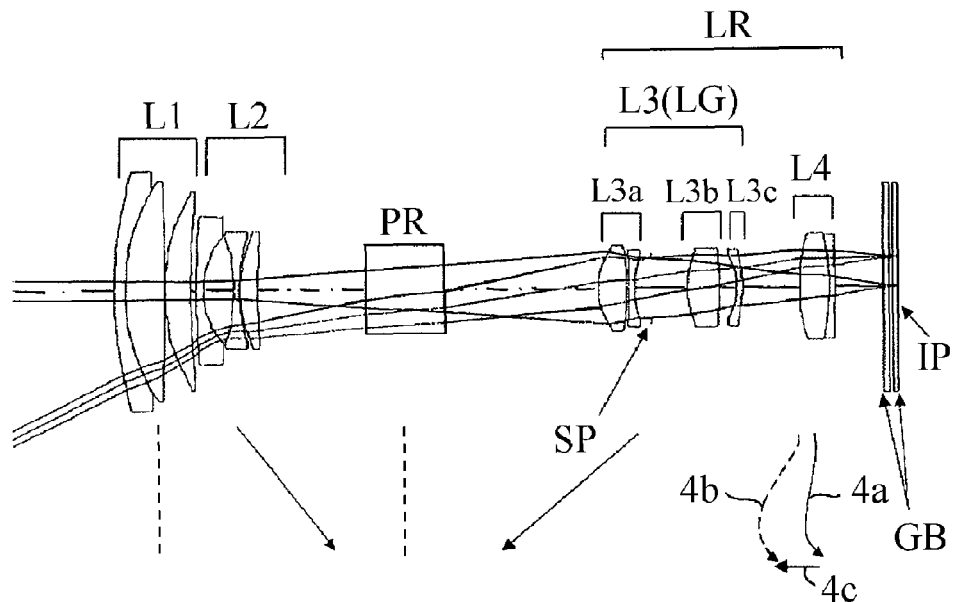
FIG. 1 is a cross sectional view of a zoom lens that is Embodiment 1 of the present invention.
Figure 2A:
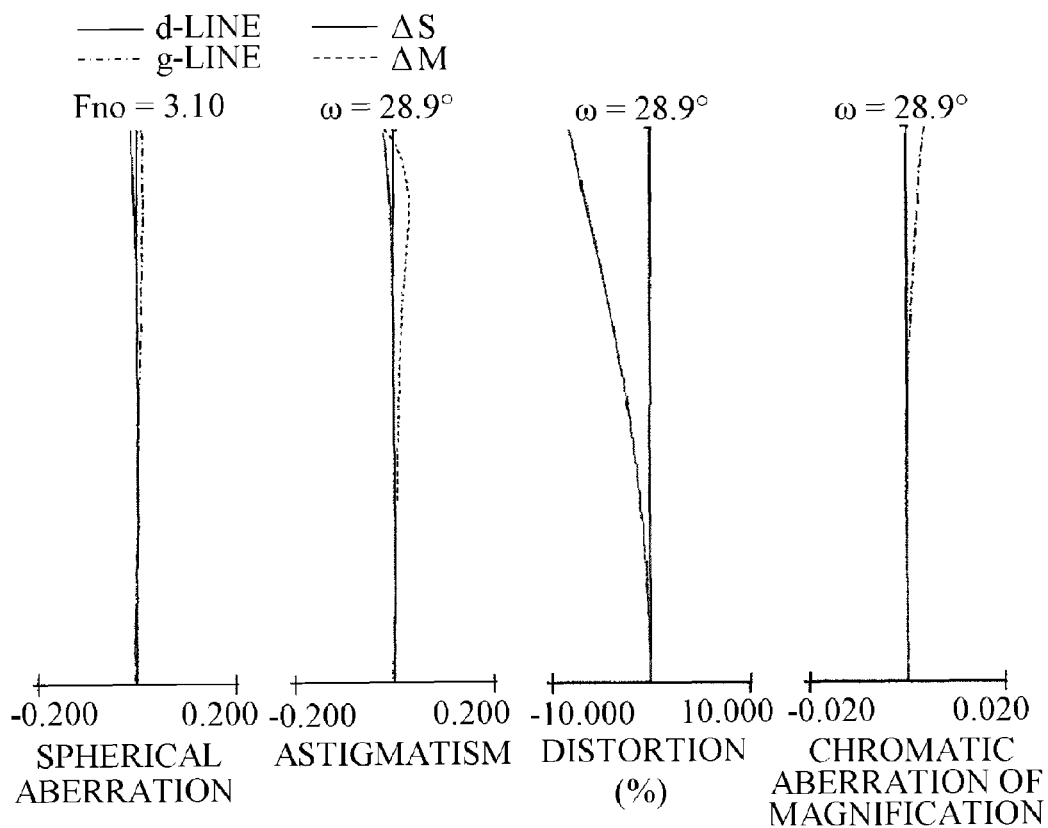
FIGS. 2A and 2B show aberration charts at a wide-angle end and at a telephoto end of the zoom lens of Embodiment 1.
Figure 2B:
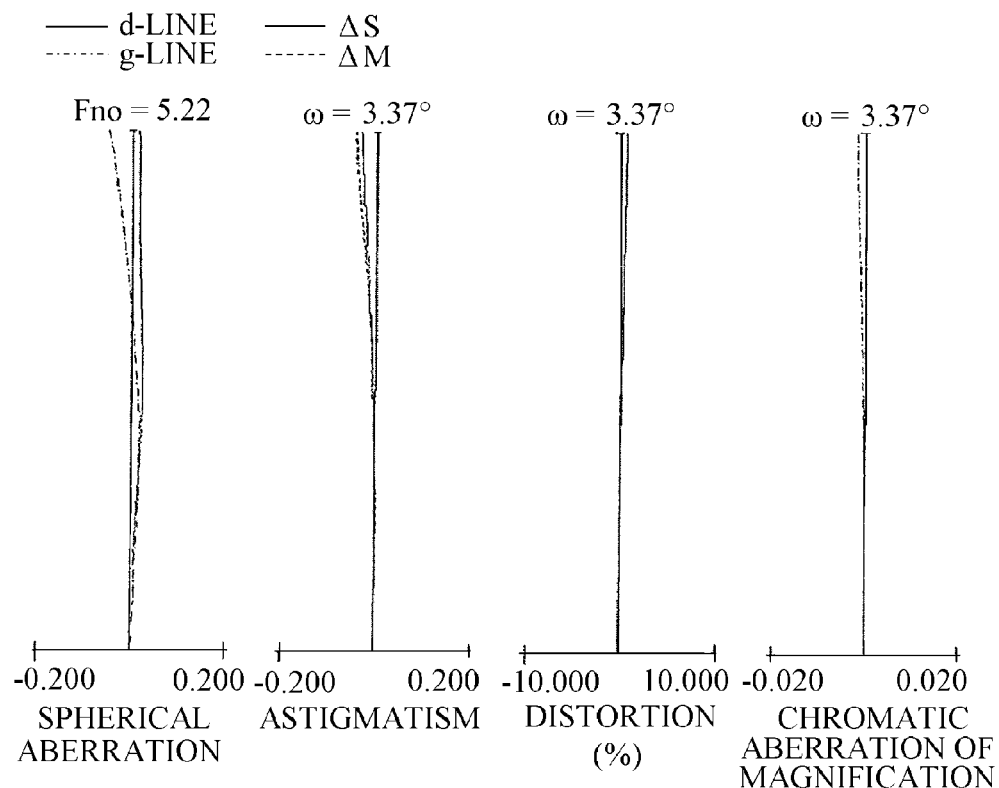

FIG. 1 is a cross sectional view of a zoom lens that is a first embodiment (Embodiment 1) of the present invention at a wide-angle end (shortest focal length end), showing a developed optical path of the zoom lens. FIGS. 2A and 2B are aberration charts of the zoom lens of Embodiment 1 at the wide-angle end and at a telephoto end (longest focal length end), respectively.

Figure 3:
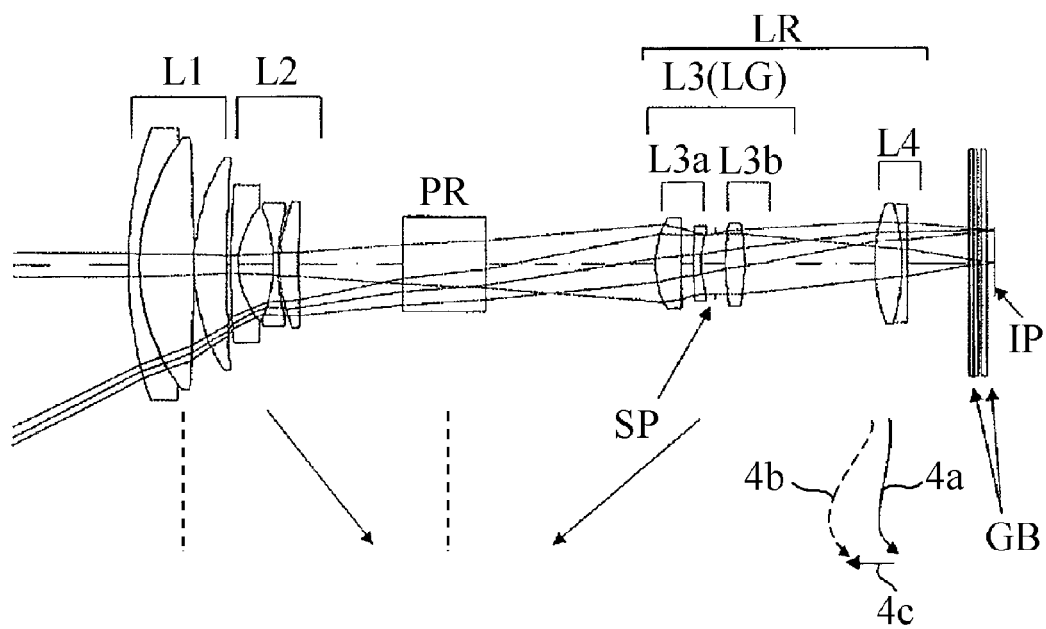
FIG. 3 is a cross sectional view of a zoom lens that is Embodiment 2 of the present invention.
Figure 4A:
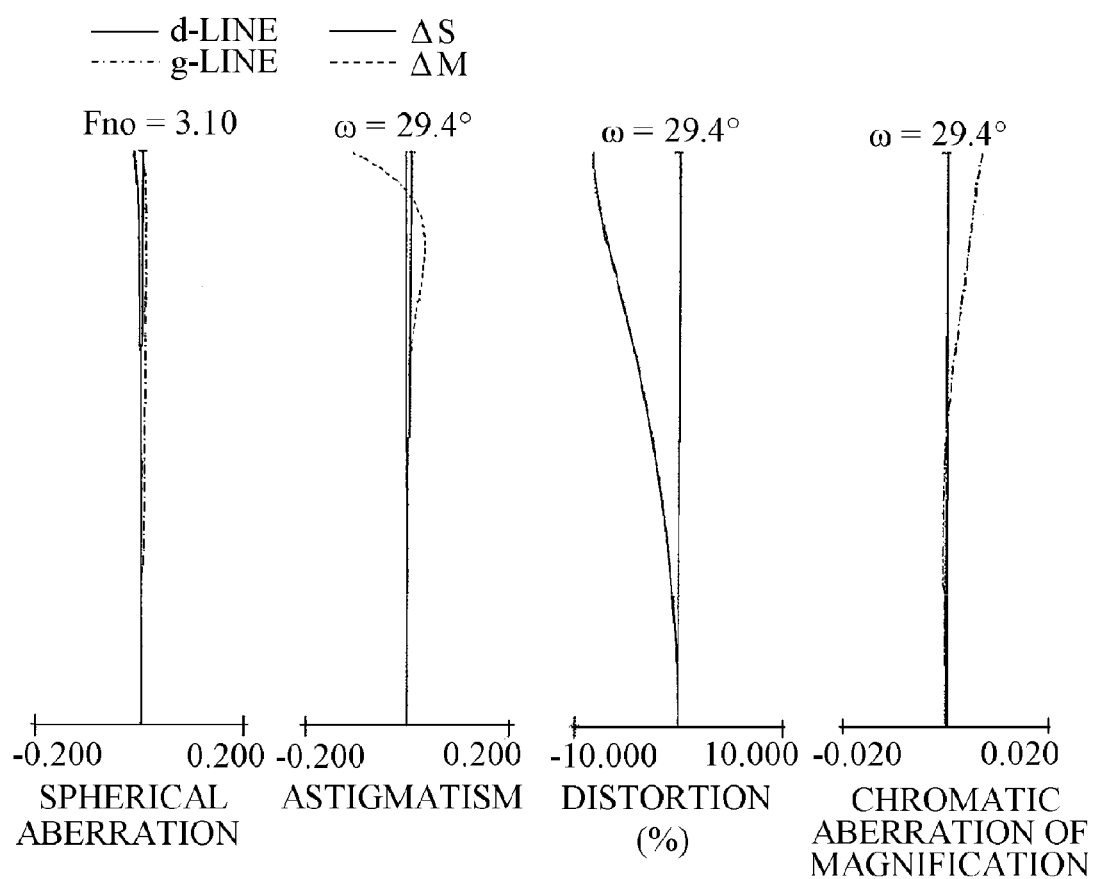
FIGS. 4A and 4B show aberration charts at a wide-angle end and at a telephoto end of the zoom lens of Embodiment 2.
Figure 4B:
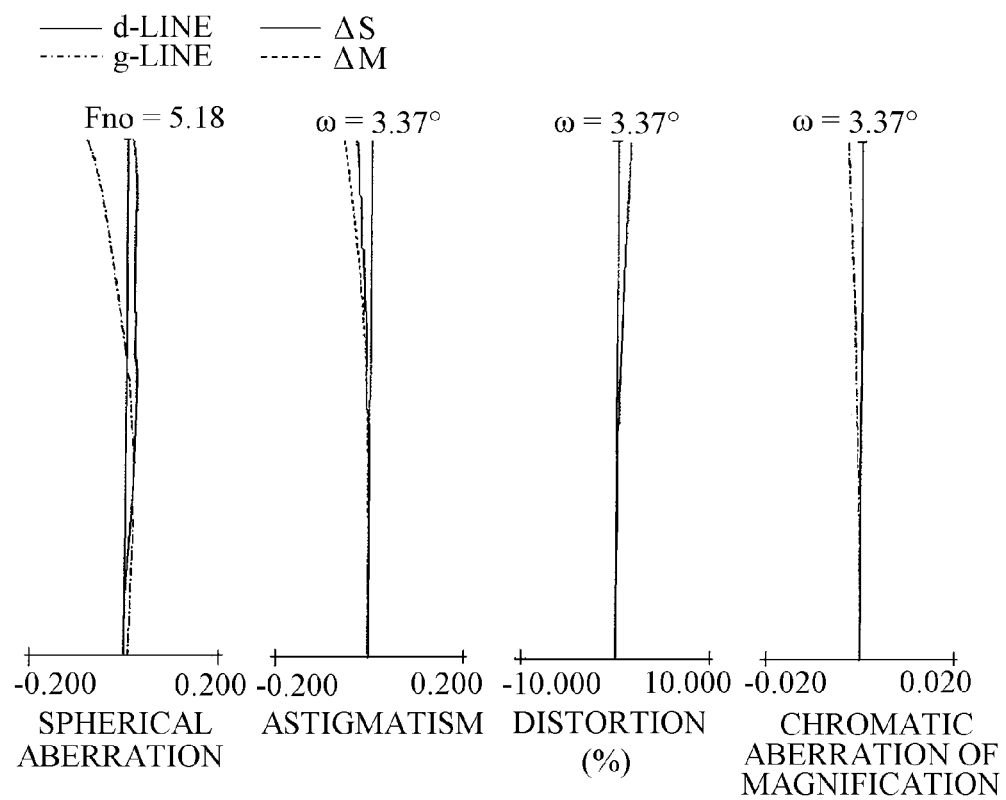

FIG. 3 is a cross sectional view of the zoom lens of a second embodiment (Embodiment 2) of the present invention at a wide-angle end, showing a developed optical path of the zoom lens. FIGS. 4A and 4B are aberration charts of the zoom lens of Embodiment 2 at the wide-angle end and at a telephoto end, respectively.

Figure 5:
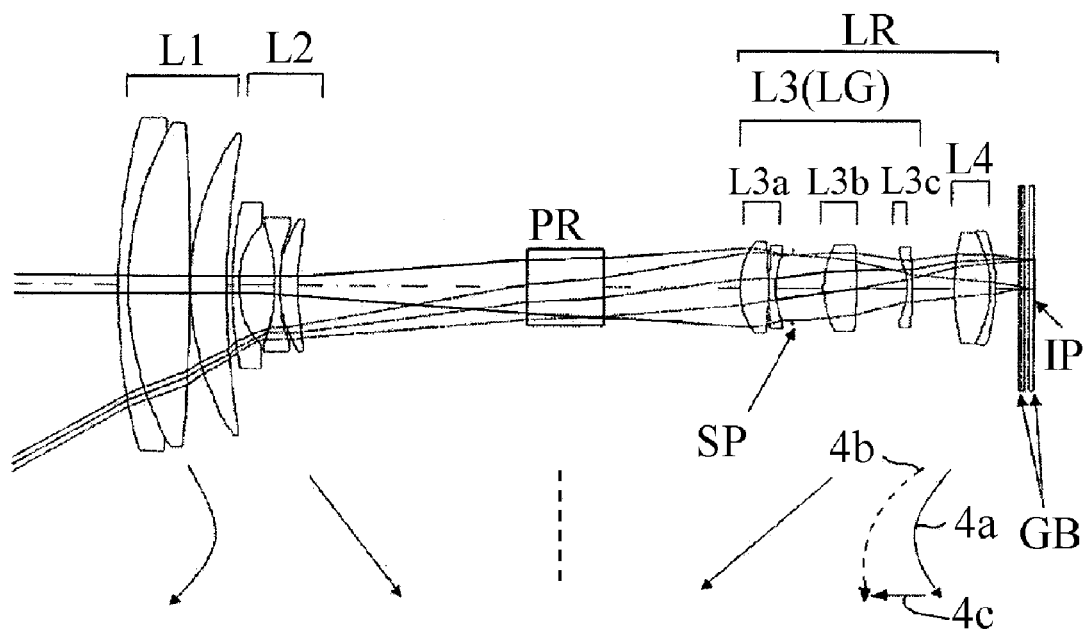
FIG. 5 is a cross sectional view of a zoom lens that is Embodiment 3 of the present invention.
Figure 6A:
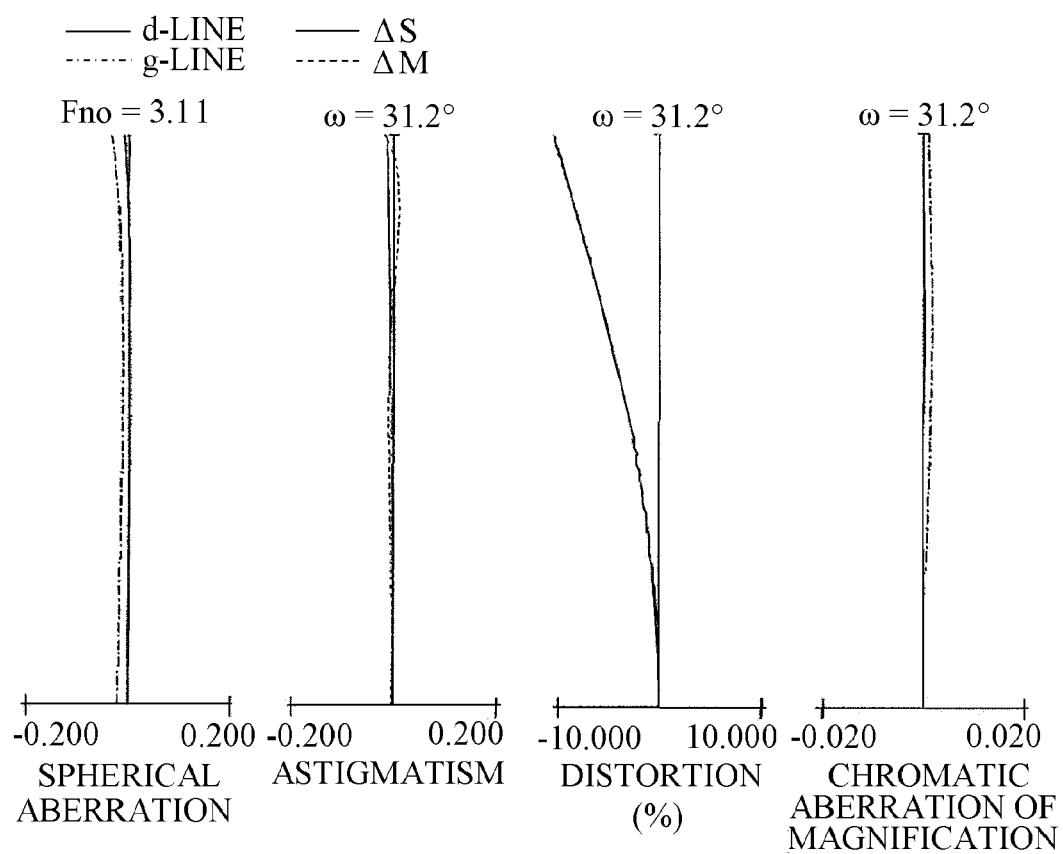
FIGS. 6A and 6B show aberration charts at a wide-angle end and at a telephoto end of the zoom lens of Embodiment 3.
Figure 6B:
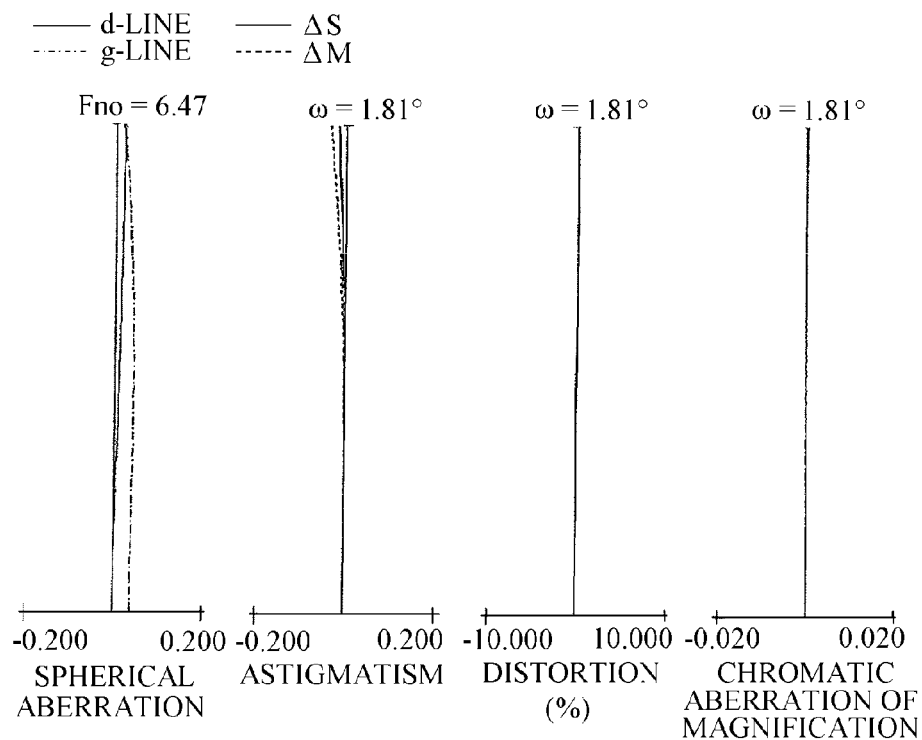

FIG. 5 is a cross sectional view of the zoom lens of a third embodiment (Embodiment 3) of the present invention at a wide-angle end, showing a developed optical path of the zoom lens. FIGS. 6A and 6B are aberration charts of the zoom lens of Embodiment 3 at the wide-angle end and at a telephoto end, respectively.

Figure 7:
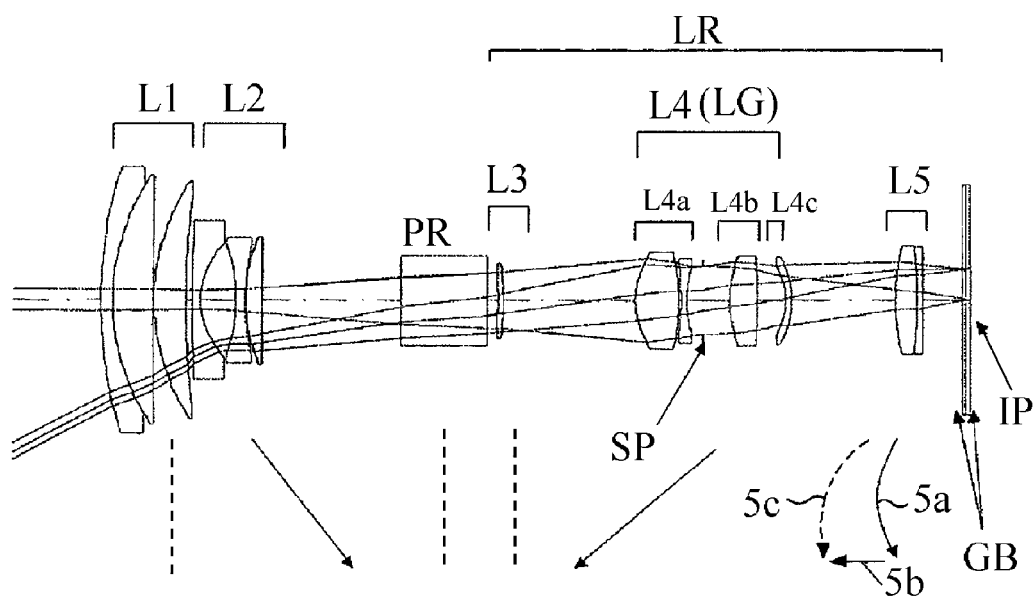
FIG. 7 is a cross sectional view of a zoom lens that is Embodiment 4 of the present invention.
Figure 8A:
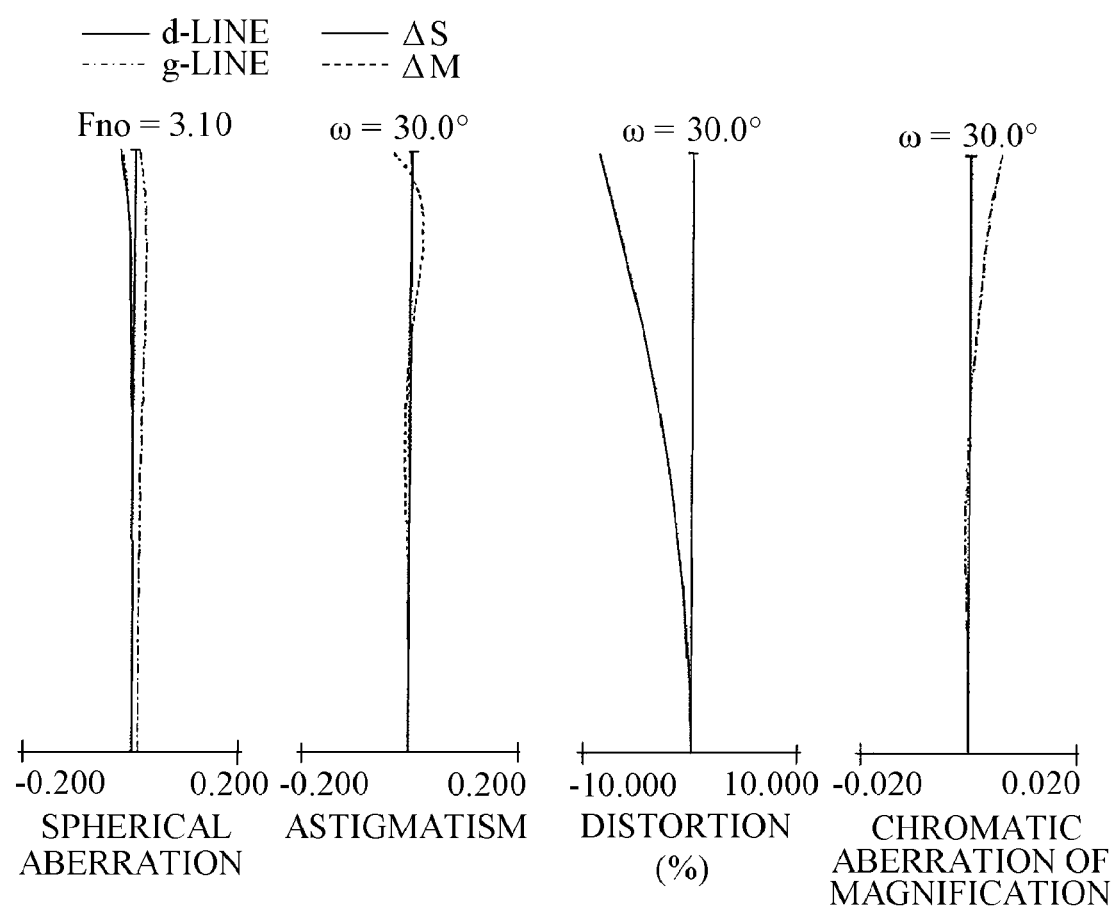
FIGS. 8A and 8B show aberration charts at a wide-angle end and at a telephoto end of the zoom lens of Embodiment 4.
Figure 8B:
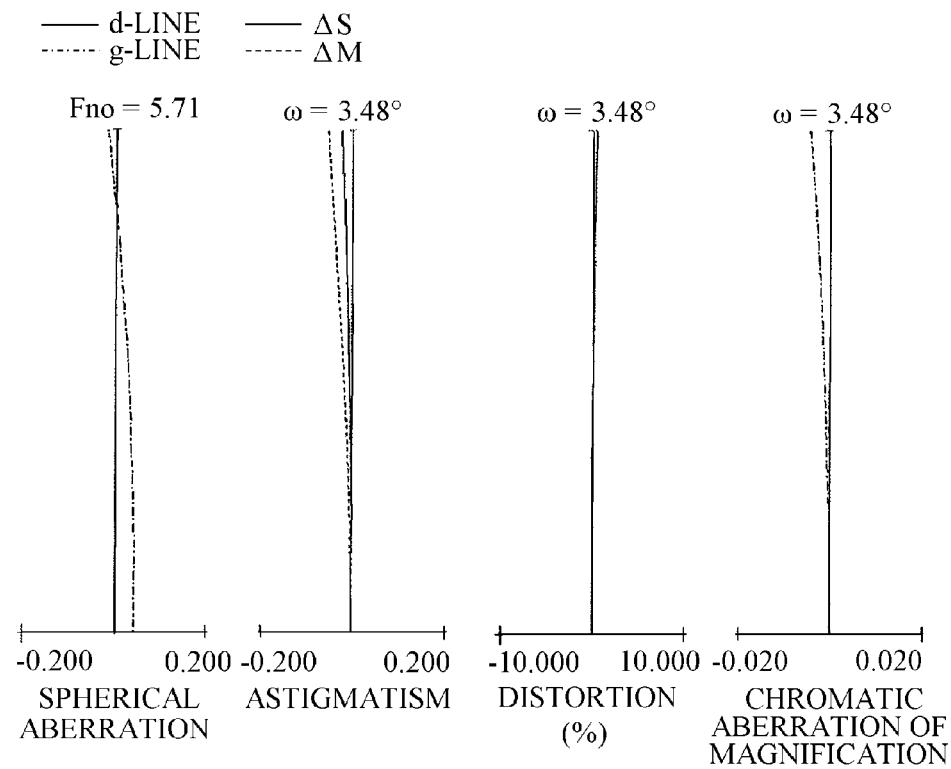

FIG. 7 is a cross sectional view of the zoom lens of a fourth embodiment (Embodiment 4) of the present invention at a wide-angle end, showing a developed optical path of the zoom lens. FIGS. 8A and 8B are aberration charts of the zoom lens of Embodiment 4 at the wide-angle end and at a telephoto end, respectively.

Figure 9:
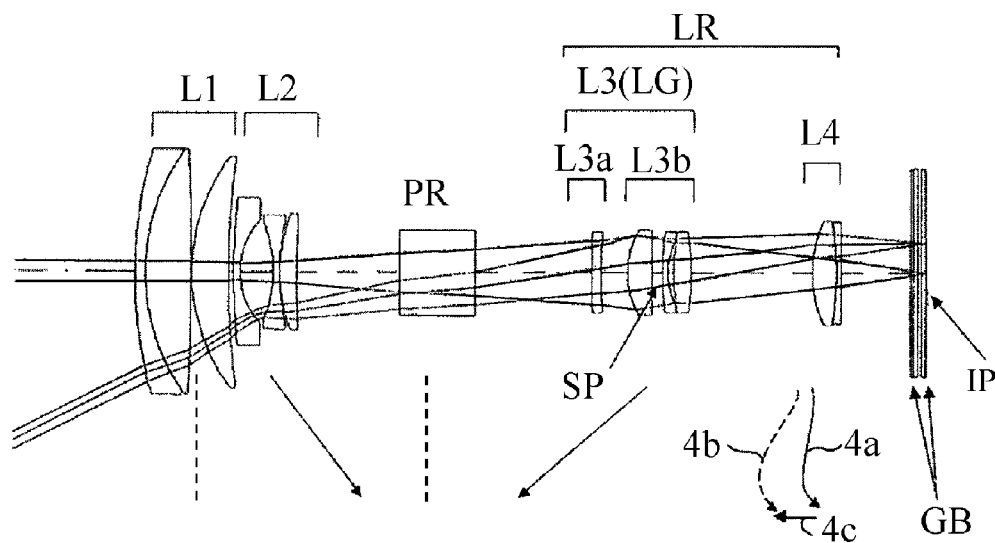
FIG. 9 is a cross sectional view of a zoom lens that is Embodiment 5 of the present invention.
Figure 10A:
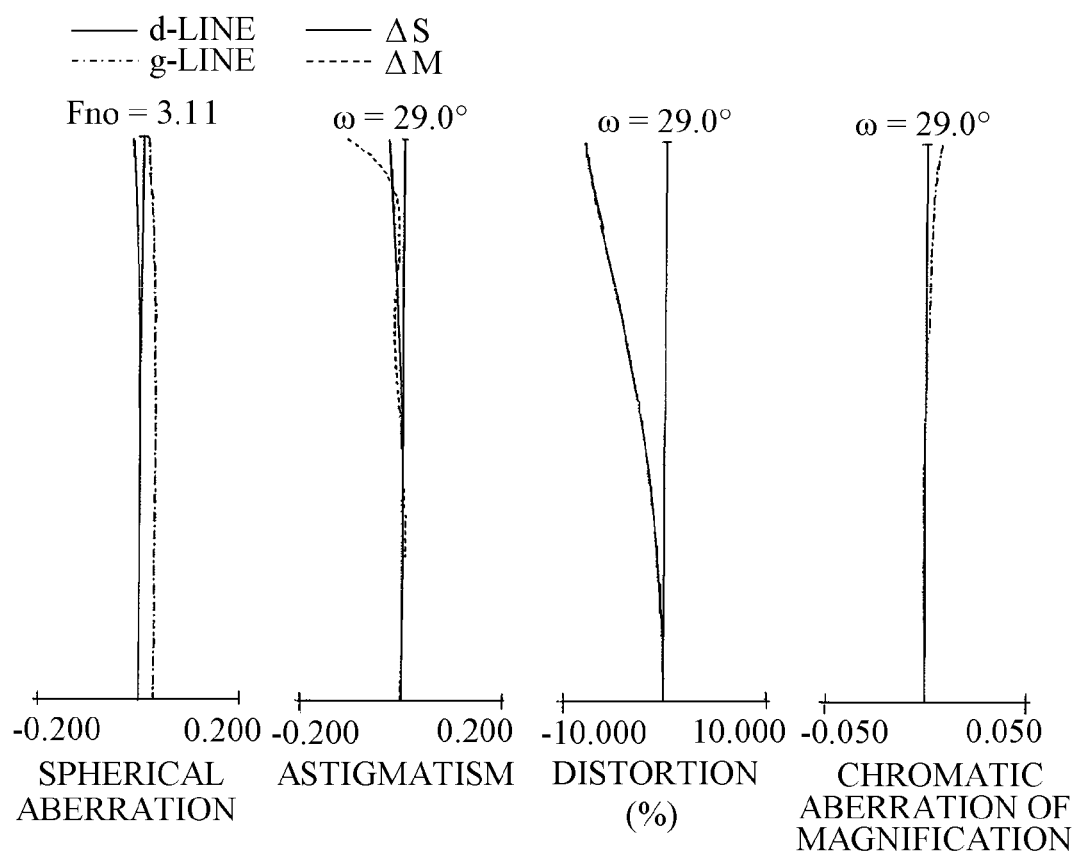
FIGS. 10A and 10B show aberration charts at a wide-angle end and at a telephoto end of the zoom lens of Embodiment 5.
Figure 10B:
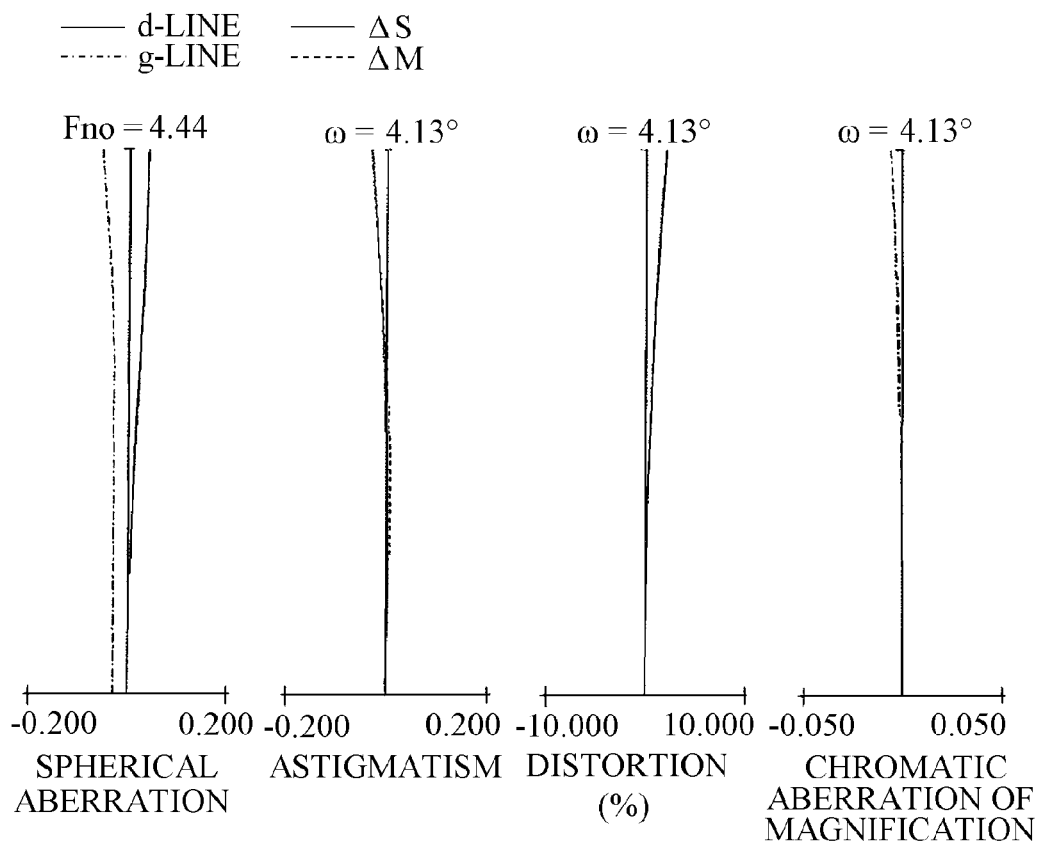

FIG. 9 is a cross sectional view of the zoom lens of a fifth embodiment (Embodiment 5) of the present invention at a wide-angle end, showing a developed optical path of the zoom lens. FIGS. 10A and 10B are aberration charts of the zoom lens of Embodiment 5 at the wide-angle end and at a telephoto end, respectively.

Figure 11:
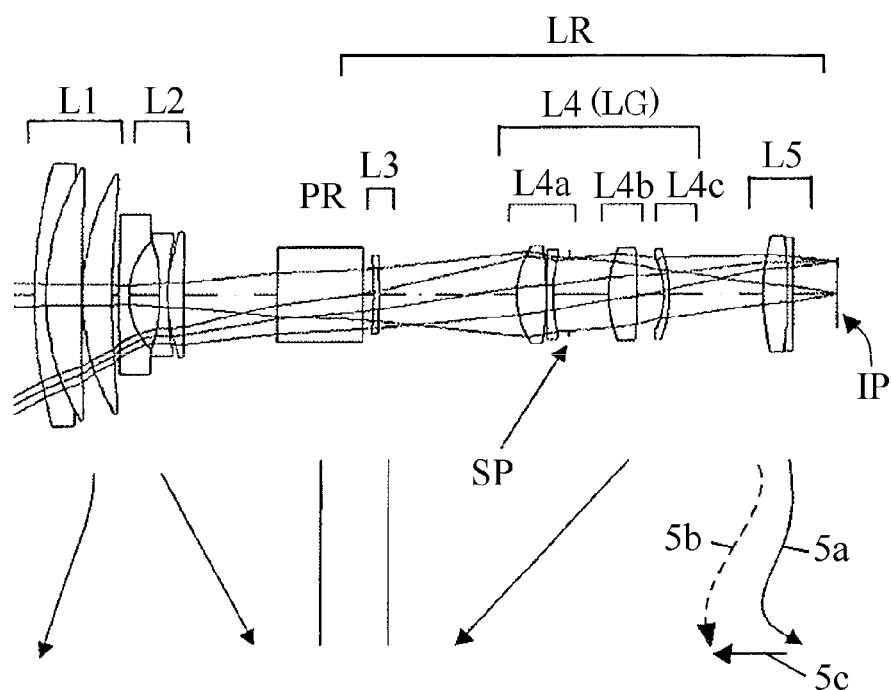
FIG. 11 is a cross sectional view of a zoom lens that is Embodiment 6 of the present invention.
Figure 12A:
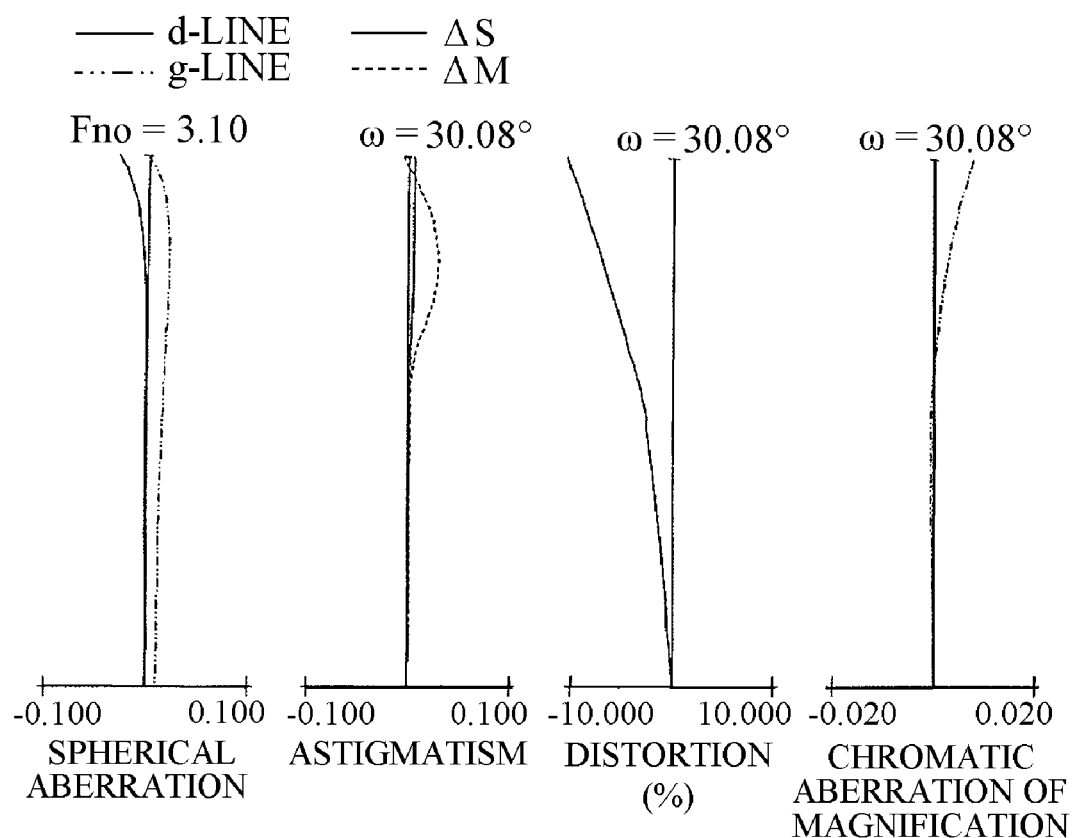
FIGS. 12A and 12B show aberration charts at a wide-angle end and at a telephoto end of the zoom lens of Embodiment 6.
Figure 12B:
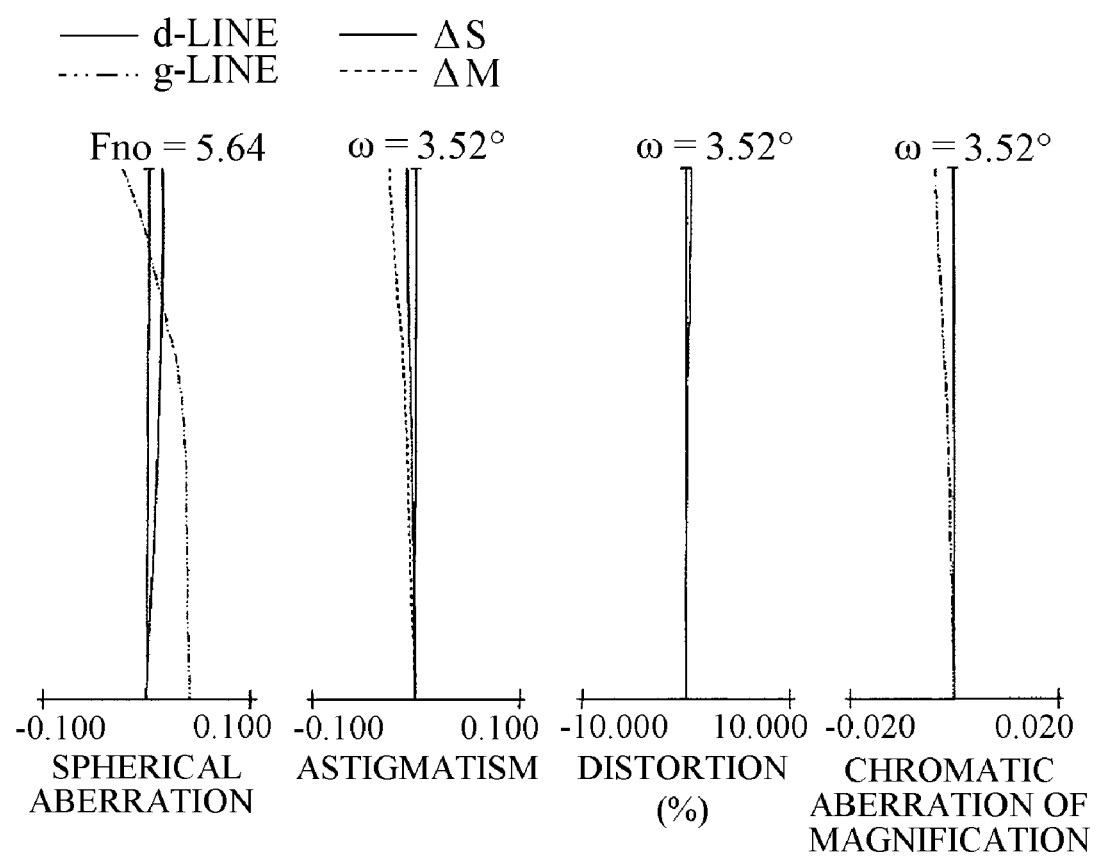

FIG. 11 is a cross sectional view of the zoom lens of a sixth embodiment (Embodiment 6) of the present invention at a wide-angle end, showing a developed optical path of the zoom lens. FIGS. 12A and 12B are aberration charts of the zoom lens of Embodiment 6 at the wide-angle end and at a telephoto end, respectively.

Figure 13:
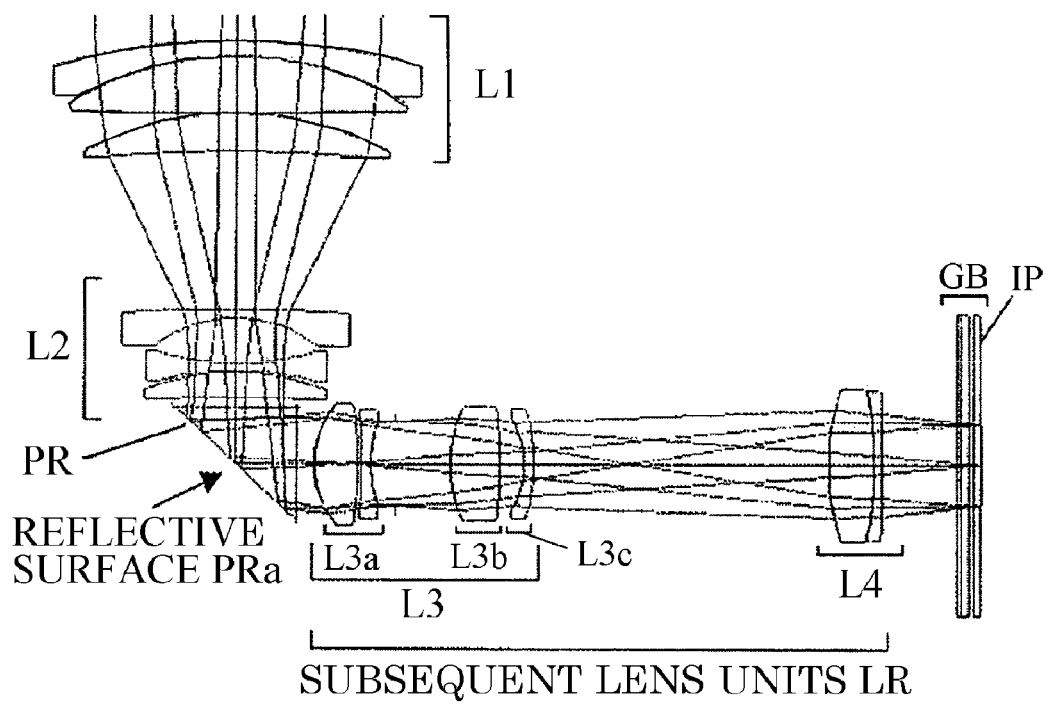
FIG. 13 is a cross sectional view of the zoom lens of Embodiment 1.

FIG. 13 is a cross sectional view of the zoom lens of Embodiment 1 whose optical axis is bent, the zoom lens being mounted on a camera.

The zoom lens of each embodiment is an image-taking optical system used for an image pickup apparatus (camera). In each cross sectional view showing the developed optical path of the zoom lens, a left side corresponds to an object side (front side), and a right side corresponds to an image side (rear side). When the zoom lens of each embodiment is used as a projection lens for an image projection apparatus (projector), the left side corresponds to a screen side and the right side corresponds to an original image side in each cross sectional view showing the developed optical path of the zoom lens.

In the lens cross sectional view of the zoom lens, reference character Li represents an i-th lens unit, i representing a number of the lens unit when counting from the object side. Reference character LR collectively denotes the above-described subsequent lens units including plural lens units. Reference character SP denotes an aperture stop. Reference character PR denotes the above-described reflective member including a reflective surface that bends the optical axis of the zoom lens by 90 degree (or around 90 degrees). In each embodiment, the reflective member PR is constituted by a prism.

Arrows other than arrows 4c and 5c indicate movement loci of the respective lens units during the zooming from the wide-angle end to the telephoto end. The arrows 4c and 5c indicate a movement direction for focusing.

In the aberration charts, reference character Fno denotes an F-number, reference characters d-line and g-line respectively denote aberrations for a d-line and a g-line. Reference characters $\Delta M$ and $\Delta S$ respectively denote aberrations in a meridional image surface and a sagittal image surface for the d-line. Chromatic aberration of magnification is shown by the g-line.

In each embodiment, a lens unit LG that is one of the subsequent lens units LR and is moved during zooming includes the following lens units from the object side to the image side:

a non-shift lens unit Ga that is unmoved during image stabilization (that is, image blur correction due to camera shaking); and a shift lens unit (image stabilizing lens unit) Gb that is moved (shifted) in a direction including a directional component orthogonal to an optical axis direction to change an image-forming position in a direction orthogonal to the optical axis direction during the image stabilization.

In Embodiments 1 to 3 and 5, the non-shift lens unit Ga and the shift lens unit Gb are respectively shown as L3a and L3b. In Embodiments 4 and 6, the non-shift lens unit Ga and the shift lens unit Gb are respectively shown as L4a and L4b.

Further, in each embodiment, the following conditions are satisfied:

$$1<(1-\beta b)\beta r<3 \tag{1}$$

$$0.70<Lb/Lp<2.00 \tag{2}$$

where $\beta b$ and $\beta r$ respectively represent a lateral magnification of the shift lens unit Gb and a total lateral magnification of all lens units disposed further on the image side than the shift lens unit Gb when the zoom lens is focused on an infinitely distant object at the telephoto end, Lb represents a distance from an image side surface of the reflective member PR to an object side lens surface of the shift lens unit Gb when the zoom lens is focused on the infinitely distant object at the telephoto end, and Lp represents a thickness of the reflective member PR on the optical axis.

In the zoom lens of each embodiment, setting is made such that a decentering sensitivity, which is a ratio of a movement amount of an optical image (that is, a change amount of the image-forming position) in the direction orthogonal to the optical axis to a unit movement amount of the shift lens unit (image stabilizing lens unit) Gb in the direction orthogonal to the optical axis, is increased. In order for such setting, the one lens unit LG of the subsequent lens units LR is divided into plural lens units including the non-shift lens unit Ga and the shift lens unit Gb, and the image stabilization is performed by moving the shift lens unit Gb that is disposed further on the image side than the non-shift lens unit Ga. Moreover, refractive powers and image-forming magnifications of the respective lens units are appropriately limited.

Further, in the zoom lens of each embodiment, the reflective member PR including the reflective surface to bend the optical axis of the zoom lens is disposed between the second lens unit L2 and the subsequent lens units LR, which enables an efficient arrangement of the entire zoom lens in the camera to achieve reduction in size and thickness of the camera.

In each embodiment, as described above, the lens unit LG is divided into at least two lens units including the non-shift lens unit Ga and the shift lens unit Gb in order from the object side, and the shift lens unit Gb disposed further on the image side than the non-shift lens unit Ga is moved in the direction including the directional component orthogonal to the optical axis direction to change the image-forming position in the direction orthogonal to the optical axis direction to perform the image stabilization. This makes it possible to secure a sufficient drive amount (movement amount or shift amount) of the shift lens unit Gb for the image stabilization without causing interference of lens holding members holding the respective lens units at the telephoto end where the second lens unit L2 and the subsequent lens units LR which are adjacent to the reflective member PR become closest to each other.

On the other hand, providing an image stabilizing lens unit in the second lens unit L2 disposed further on the object side than the reflective member PR requires a space in which an actuator and a drive mechanism for driving the image stabilizing lens unit are disposed, which increases the thickness of the camera. Therefore, in each embodiment, the image stabilization is performed by driving part of the lens unit LG disposed further on the image side than the reflective member PR.

The condition (1) is to limit a drive amount (that is, a reciprocal of the decentering sensitivity) of the shift lens unit Gb in the direction orthohgonal to the optical axis direction to correct at least a certain amount of image blur without increasing aberration variation during the image stabilization. A value of $(1-\beta b)\beta r$ lower than the lower limit of the condition (1) increases the drive amount of the shift lens unit Gb, which undesirably increases the aberration variation. On the other hand, a value of $(1-\beta b)\beta r$ higher than the upper limit of the condition (1) increases a refractive power of the shift lens unit Gb, which also undesirably increases the aberration variation.

It is preferable that the numerical range of the condition (1) be changed to that of the following condition (1a), which enables reduction of the aberration variation during the image stabilization.

$$1.2<(1-\beta b)\beta r<2.5 \tag{1a}$$

The condition (2) is a condition for performing effective image stabilization while preventing the interference of the lens holding members. A value of Lb/Lp lower than the lower limit of the condition (2) brings the shift lens unit Gb closer to the reflective member PR, which causes the interference of the lens holding members respectively holding the second lens unit L2 and the subsequent lens units LR at the telephoto end in a case where, for example, the zoom lens requires a large image blur correction amount. Alternatively, the value of Lb/Lp lower than the lower limit of the condition (2) makes it necessary to increase a distance between the shift lens unit Gb and the reflective member PR, which undesirably causes an increase in size of the zoom lens.

On the other hand, a value of Lb/Lp higher than the upper limit of the condition (2) enlarges a diameter of the shift lens unit Gb, which increases not only a weight of the shift lens unit Gb but also the drive amount thereof. This undesirably increases the thickness of the camera.

It is preferable that the numerical range of the condition (2) be changed to that of the following condition (2a), which can secure a more appropriate image blur correction amount.

$$0.75<Lb/Lp<1.50 \tag{2a}$$

Further, in each embodiment, it is more preferable that at least one of the following conditions (3) to (6) be satisfied. The satisfaction of at least one of the following conditions (3) to (6) can acquire an effect corresponding to the satisfied condition.

$$0.1<fr/\sqrt{(fw \cdot ft)}<4.0 \tag{3}$$

$$1.0<fstr/fw<3.2 \tag{4}$$

$$0.1<fb/ft<0.5 \tag{5}$$

$$0.7<(Lp+Lb)/\phi 2r<3.0 \tag{6}$$

where fr represents a focal length of the all lens units disposed further on the image side than the shift lens unit Gb when the zoom lens is focused on the infinitely distant object at the telephoto end, and fw and ft respectively represent focal lengths of the entire zoom lens at the wide-angle end and at the telephoto end. Moreover, fstr represents a focal length of a lens unit whose movement amount in the optical axis direction during zooming is largest in the subsequent lens units LR, and fb represents a focal length of the shift lens unit Gb. Furthermore, $\phi 2r$ represents an effective diameter of an image side lens surface of the second lens unit L2.

The condition (3) is to limit the focal length of the all lens units disposed further on the image side than the shift lens unit Gb when the zoom lens is focused on the infinitely distant object at the telephoto end. A value of $fr/\sqrt{(fw \cdot ft)}$ lower than the lower limit of the condition (3) undesirably increases the drive amount of the shift lens unit Gb for the image stabilization. A value of $fr/\sqrt{(fw \cdot ft)}$ higher than the upper limit of the condition (3) undesirably decreases mechanical following capability.

It is still more preferable that the numerical range of the condition (3) be changed to that of the following condition (3a), which facilitates image stabilization with reduced aberration variation and good mechanical following capability.

$$0.4<fr/\sqrt{(fw \cdot ft)}<3.1 \tag{3a}$$

The condition (4) is to limit the focal length of the lens unit (the third lens unit L3 in Embodiment 1 to 3 and 5, or the fourth lens unit L4 in Embodiment 4) whose movement amount in the optical axis direction during the zooming is largest in the subsequent lens units LR. A value of fstr lower than the lower limit of the condition (4) excessively increases a refractive power of the lens unit LX, which undesirably increases aberration variation during the zooming. A value of fstr higher than the upper limit of the condition (4) excessively decreases the refractive power of the lens unit LX, which undesirably increases a stroke (movement amount) of the lens unit LX for obtaining a desired magnification ratio (zoom ratio), thereby increasing the size of the zoom lens. Further, the value of fstr higher than the upper limit of the condition (4) makes it difficult to make a space for disposing the reflective member PR.

It is still more preferable that the numerical range of the condition (4) be changed to that of the following condition (4a), which facilitates reduction of the aberration variation during the zooming.

$$2.4 < fstr/fw < 3.2 \quad (4a)$$

The condition (5) is to limit a ratio of the focal length of the shift lens unit Gb to the focal length of the entire zoom lens at the telephoto end. A value of fb/ft lower than the lower limit of the condition (5) increases the refractive power of the shift lens unit Gb, which undesirably increases the aberration variation during the zooming. A value of fb/ft higher than the upper limit of the condition (5) undesirably increases the drive amount of the shift lens unit Gb.

It is still more preferable that the numerical range of the condition (5) be changed to that of the following condition (5a), which facilitates zooming with reduced aberration variation and image stabilization with an appropriate drive amount of the shift lens unit Gb.

$$0.12 < fb/ft < 0.40 \quad (5a)$$

The condition (6) is to limit a ratio of the distance from the image side surface of the reflective member PR to the object side lens surface of the shift lens unit Gb, to the effective diameter of the most image side surface of the second lens unit L2. A value of $(Lp+Lb)/\phi 2r$ lower than the lower limit of the condition (6) excessively decreases the distance from the reflective member PR to the shift lens unit Gb, which makes it easy to cause the interference between the lens holding members respectively holding the second lens unit L2 and the subsequent lens units LR during the image stabilization. On the other hand, a value of $(Lp+Lb)/\phi 2r$ higher than the upper limit of the condition (6) excessively increases the distance from the reflective member PR to the shift lens unit Gb, which increases the size of the zoom lens.

It is still more preferable that the numerical range of the condition (6) be changed to that of the following condition (6a), which can achieve a more compact zoom lens as a whole.

$$1.0 < (Lp+Lb)/\phi 2r < 2.0 \quad (6a).$$

Further, it is desirable that the shift lens unit Gb include at least one aspheric surface. The aspheric surface facilitates reduction of variation of comatic aberration caused due to the movement of the shift lens unit Gb in the direction orthogonal to the optical axis direction.

As described above, in each embodiment, the reflective member (prism) PR including the reflective surface that bends the optical axis of the zoom lens is disposed between the second lens unit L2 and the subsequent lens units LR, and during the zooming the second lens unit L2 and part of the subsequent lens units LR are moved while the reflective member PR is fixed. Such a configuration achieves a high zoom ratio, and reduces a thickness of the camera (that is, a length of the camera in a front-rear direction) in which the zoom lens is installed. Further, in each embodiment, the shift lens unit Gb that is part of the subsequent lens units LR is moved in the direction orthogonal to the optical axis direction to perform the image stabilization. This can secure the drive amount of the shift lens unit Gb required for performing sufficient image blur correction without causing the interference between the lens holding members respectively holding the shift lens unit Gb and the subsequent lens units LR at the telephoto end where these lens units Gb and LR adjacent to the reflective member PR become closest to each other.

Next, description will be made of features of a lens configuration of each embodiment.

In FIG. 1 showing the cross sectional view of the zoom lens of Embodiment 1, reference character L1 denotes the first lens unit having a positive refractive power. The refractive power corresponds to an optical power, and the optical power is equal to a reciprocal of a focal length. Reference character L2 denotes the second lens unit having a negative refractive power. Reference character LR denotes the subsequent lens units including plural lens units. The subsequent lens units LR are constituted by a third lens unit L3 having a positive refractive power and a fourth lens unit L4 having a positive refractive power. Reference character PR denotes the reflective member (prism) including a reflective surface PRa. The reflective member PR is disposed between the second lens unit L2 and the third lens unit L3. The reflective member PR reflects a light ray on an optical axis by 90 degrees with respect to an incident direction of the light ray, as shown in FIG. 13.

Reference character SP denotes the aperture stop. Reference character GB denotes an optical block such as an optical filter or a face plate. Reference character IP denotes an image surface (image plane). The image surface IP corresponds to an image pickup surface of a solid-state image pickup element (photoelectric conversion element) such as a CCD sensor, a CMOS sensor or a film surface of a silver-halide film when the zoom lens is used as an image-taking optical system for a video camera, a digital still camera or a film camera. The arrows other than the arrow 4c show the movement loci of the respective lens units during the zooming from the wide-angle end to the telephoto end. During the zooming, the reflective member PR is fixed (unmoved). During the zooming from the wide-angle end to the telephoto end, the second lens unit L2 is moved to the image side and the third lens unit L3 is moved to the object side to perform variation of magnification. Further, the fourth lens unit L4 is moved to correct image surface variation caused in association with the variation of magnification and to perform focusing. The movement locus of the fourth lens unit L4 during the zooming has a shape convex toward the object side, which utilizes a space between the third lens unit L3 and the fourth lens unit L4 for focusing to effectively reduce the entire length of the zoom lens.

A curved solid line 4a and a curved dotted line 4b are movement loci of the fourth lens unit L4 to correct the image surface variation caused in association with the variation of magnification when the zoom lens is focused on an infinitely distant object and a near object, respectively. When focusing from the infinitely distant object to the near object is performed at the telephoto end, the fourth lens unit L4 is moved forward as shown by the arrow 4c. The wide-angle end and the telephoto end in each embodiment are defined as zoom positions where the lens units movable during the zooming are located at mechanical ends of their movable ranges.

In this embodiment, the second lens unit L2 and the third lens unit L3 have a strong optical power to achieve a high magnification ratio (high zoom ratio) while securing a space for disposing the reflective member PR. Although the second lens unit L2 is moved to the image side during the zooming from the wide-angle end to the telephoto end, the second lens unit L2 may be moved along a locus convex toward the image side during that zooming. Further, in this embodiment, the third lens unit L3 is moved to the object side to achieve a high zoom ratio of 9.4.

The zoom lens of this embodiment is a positive-lead type zoom lens in which an effective diameter of light rays is comparatively small in an optical path between the second lens unit L2 and the third lens unit L3. Therefore, the reflective member PR bending the optical path from the object side is disposed between the second lens unit L2 and the third lens unit L3. The reflective member PR includes the reflective surface PRa bending light rays from the object (in other words, the optical axis) by 90 degrees or around 90 degrees (within 90±10 degrees).

FIG. 13 shows a state where the light rays (optical axis of the zoom lens) is bent by the reflective member PR. In FIG. 13, reference character PRa denotes the reflective surface which is formed inside the reflective member PR and bends the optical axis from the object side. As shown in FIG. 13, bending the light rays from the object by 90 degrees by the reflective member PR as a prism including the reflective surface PRa thereinside reduces the thickness (length in the front-rear direction) of the camera in which the zoom lens is installed.

The third lens unit L3 (LG) is constituted by, in order from the object side to the image side, a 3-a lens unit (Ga) L3a having a positive refractive power and corresponding to the non-shift lens unit that is unmoved during the image stabilization, a 3-b lens unit L3b (Gb) having a positive refractive power and corresponding to the shift lens unit (image stabilizing lens unit) that is moved for the image stabilization, and a 3-c lens unit L3c (Ga) having a negative refractive power and being unmoved during the image stabilization. The 3-b lens unit L3b is moved in the direction including the directional component orthogonal to the optical axis direction for the image stabilization.

Such a lens configuration secures at the telephoto end the drive amount of the 3-b lens unit L3b for the image stabilization without increasing the distance between the reflective member PR and the third lens unit L3. Moreover, providing the 3-c lens unit L3c having the negative refractive power enables increase of the positive refractive power of the 3-b lens unit L3b and increase of an image side lateral magnification, which makes it possible to reduce the drive amount of the 3-b lens unit L3b during the image stabilization, thereby decreasing the aberration variation during the image stabilization. It is preferable that the 3-b lens unit L3b include an aspheric surface, which facilitates reduction of the comatic aberration vibration during the image stabilization.

The aperture stop SP is disposed further on the image side than the 3-a lens unit L3a.

The image stabilizing lens unit may be swung (rotationally moved) around a certain point on the optical axis. In other words, moving the 3-b lens unit L3b for the image stabilization in the direction including the directional component orthogonal to the optical axis direction causes movement of the image on the image surface.

The first lens unit L1 is unmoved in the optical axis direction for zooming and focusing. However, the first lens unit L1 may be moved in the optical axis direction as needed, for example, for aberration correction.

The zoom lens of Embodiment 2 shown in FIG. 3 is different in lens configuration of the third lens unit L3 from the zoom lens of Embodiment 1 shown in FIG. 1. A zoom ratio of the zoom lens of this embodiment is 9.4.

The third lens unit L3 in this embodiment is constituted by, in order from the object side to the image side, a 3-a lens unit L3a having a positive refractive power and corresponding to the non-shift lens unit that is unmoved during the image stabilization, and a 3-b lens unit L3b having a positive refractive power and corresponding to the shift lens unit that is moved for the image stabilization. The zoom lens of this embodiment does not include the negative 3-c lens unit L3c included in the zoom lens of Embodiment 1, and therefore the drive amount of the 3-b lens unit L3b for the image stabilization is increased as compared with that of Embodiment 1. The lens configuration of the zoom lens of this embodiment other than the third lens unit L3 is the same as that in Embodiment 1.

The zoom lens of Embodiment 3 shown in FIG. 5 is different in that the first lens unit L1 is moved along a locus convex toward the image side during the zooming from the wide-angle end to the telephoto end from the zoom lens of Embodiment 1 shown in FIG. 1. The zoom lens of this embodiment moves the first lens unit L1 during the zooming to achieve a high zoom ratio of 19.2. The lens configuration of the zoom lens of this embodiment other than the first lens unit L1 is the same as that in Embodiment 1.

In FIG. 7 showing the cross sectional view of the zoom lens of Embodiment 4, reference character L1 denotes the first lens unit having a positive refractive power, and reference character L2 denotes the second lens unit having a negative refractive power. Reference character LR denotes the subsequent lens units including plural lens units.

In this embodiment, the subsequent lens units LR are constituted by a third lens unit L3 having a negative refractive power, a fourth lens unit L4 having a positive refractive power and a fifth lens unit L5 having a positive refractive power. During the zooming from the wide-angle end to the telephoto end, variation of magnification is performed by moving the second lens unit L2 to the image side and the fourth lens unit L4 to the object side, and correction of image surface variation caused in association with the variation of magnification is performed by moving the fifth lens unit L5.

A curved solid line 5a and a curved dotted line 5b are movement loci of the fifth lens unit L5 to correct the image surface variation caused in association with the zooming from the wide-angle end to the telephoto end when the zoom lens is focused on an infinitely distant object and a near object, respectively. When focusing from the infinitely distant object to the near object is performed at the telephoto end, the fifth lens unit L5 is moved forward (to the object side) as shown by an arrow 5c. A zoom ratio of the zoom lens of this embodiment is 9.5.

During the zooming from the wide-angle end to the telephoto end, the reflective member PR, the first lens unit L1 and the third lens unit L3 are unmoved. The second lens unit L2 and the fourth lens unit L4 have a strong refractive power to achieve a high magnification ratio (high zoom ratio) while securing a space for disposing the reflective member PR.

Although the second lens unit L2 is moved to the image side during the zooming from the wide-angle end to the telephoto end, the second lens unit L2 may be moved along a locus convex toward the image side.

In addition, the fourth lens unit L4 is moved to the object side during the zooming from the wide-angle end to the telephoto end, which achieves a high zoom ratio of about 10.

The fifth lens unit L5 is moved along a locus convex toward the object side to correct the image surface variation caused in association therewith. The fourth lens unit L4 is constituted by, in order from the object side to the image side, a 4-a lens unit L4a having a positive refractive power and corresponding to the non-shift lens unit, a 4-b lens unit L4b having a positive refractive power and corresponding to the shift lens unit, and a 4-c lens unit L4c having a negative refractive power. The 4-b lens unit L4b is moved in the direction including the directional component orthogonal to the optical axis direction to move an optical image (image-forming position) in the direction orthogonal to the optical axis direction for the image stabilization.

The aperture stop SP is disposed further on the image side than the 4-a lens unit L4a. The lens configuration of the zoom lens of this embodiment other than the above-described configuration is the same as that in Embodiment 1.

The zoom lens of Embodiment 5 shown in FIG. 9 is different in lens configuration of the third lens unit L3 from the zoom lens of Embodiment 1 shown in FIG. 1. A zoom ratio of the zoom lens of this embodiment is 7.7.

The third lens unit L3 of this embodiment is constituted by, in order from the object side to the image side, a 3-a lens unit L3a having a negative refractive power and corresponding to the non-shift lens unit, and a 3-b lens unit L3b having a positive refractive power and corresponding to the shift lens unit. The 3-b lens unit L3b is moved in the direction including the directional component orthogonal to the optical axis direction to move an optical image (image-forming position) in the direction orthogonal to the optical axis direction for the image stabilization. The lens configuration of the zoom lens of this embodiment other than the above-described configuration is the same as that in Embodiment 1.

Although each embodiment has described the zoom lens constituted by four or five lens units, an additional lens unit such as a lens unit having a refractive power or a comparator lens may be disposed further on the object side than the first lens unit L1 as needed.

In the zoom lens of Embodiment 6 shown in FIG. 11, the subsequent lens units LR include a third lens unit L3 having a negative refractive power, a fourth lens unit L4 having a positive refractive power and a fifth lens unit L5 having a positive refractive power. During the zooming from the wide-angle end to the telephoto end, the first lens unit L1 is moved to the object side, the second lens unit L2 is moved to the image side and the fourth lens unit L4 is moved to the object side to perform variation of magnification, and the fifth lens unit L5 is moved to correct the image surface variation caused in association with the variation of magnification.

A curved solid line 5a and a curved dotted line 5b are movement loci of the fifth lens unit L5 to correct the image surface variation caused in association with the zooming from the wide-angle end to the telephoto end when the zoom lens is focused on an infinitely distant object and a near object, respectively. When focusing from the infinitely distant object to the near object is performed at the telephoto end, the fifth lens unit L5 is moved forward (to the object side) as shown by an arrow 5c. A zoom ratio of the zoom lens of this embodiment is 9.4.

During the zooming from the wide-angle end to the telephoto end, the reflective member PR and the third lens unit L3 are unmoved. The second lens unit L2 and the fourth lens unit L4 have a strong refractive power to achieve a high magnification ratio (high zoom ratio) while securing a space for disposing the reflective member PR.

Although the second lens unit L2 is moved to the image side during the zooming from the wide-angle end to the telephoto end, the second lens unit L2 may be moved along a locus convex toward the image side.

In addition, the first and fourth lens units L1 and L4 are moved to the object side during the zooming from the wide-angle end to the telephoto end, which achieves a high zoom ratio of about 10. The fifth lens unit L5 is moved along a locus convex toward the object side to correct the image surface variation caused in association therewith. The fourth lens unit L4 is constituted by, in order from the object side to the image side, a 4-a lens unit L4a having a positive refractive power corresponding to the non-shift lens unit, a 4-b lens unit L4b having a positive refractive power and corresponding to the shift lens unit, and a 4-c lens unit L4c having a negative refractive power. The 4-b lens unit L4b is moved in the direction including the directional component orthogonal to the optical axis direction to move an optical image (image-forming position) in the direction orthogonal to the optical axis direction for the image stabilization.

The aperture stop SP is disposed further on the image side than the 4-a lens unit L4a. The lens configuration of the zoom lens of this embodiment other than the above-described configuration is the same as that in Embodiment 1.

In the zoom lens of each of Embodiments 1 to 6, an aperture diameter of the aperture stop SP may be controlled to reduce variation of the F-number during the zooming. Moreover, when the zoom lens is used with an image pickup apparatus equipped with an image pickup element converting an optical image formed on its light-receiving surface into an electrical signal, image data obtained from the electrical signal may be electrically corrected according to an amount of distortion aberration of the zoom lens.

Next, description will be made of a digital still camera (image pickup apparatus) that is an embodiment of the present invention with reference to FIG. 14. The camera uses the zoom lens of any one of Embodiments 1 to 6 as an image-taking optical system.

Figure 14:
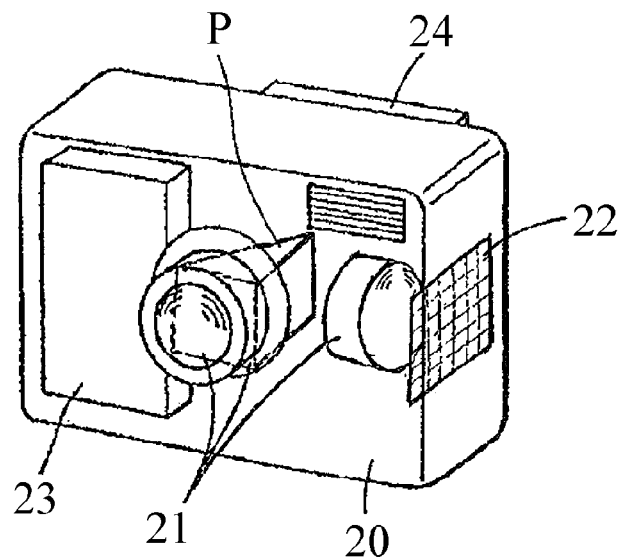
FIG. 14 is a schematic view of an image pickup apparatus that is an embodiment of the present invention.

In FIG. 14, reference numeral 20 denotes a main body of the camera, and reference numeral 21 denotes the image-taking optical system. Reference character P denotes a prism that is the reflective member. The image-taking optical system 21 forms an optical image of an object on a solid-state image pickup element (photoelectric conversion element) 22.

Reference numeral 23 denotes a recording medium recording image data generated based on an electrical signal output from the image pickup element 22. Reference numeral 24 denotes a viewfinder to cause a user to observe the image data displayed on a display element, not shown. The display element is constituted by a display device such as a liquid crystal panel. The use of the zoom lens of any one of Embodiments 1 to 6 can achieve a small camera having high optical performance.

Next, numerical examples corresponding to Embodiments 1 to 6 will be described. In each numerical example, i denotes a surface number when counting from the object side, ri denotes a curvature radius of a lens surface, di denotes a lens thickness or a distance in air between an i-th surface and an i+1-th surface.

ndi and vdi respectively denote a refractive index and an Abbe constant for a d-line. Most image side five surfaces are planes corresponding to surfaces of a glass block or a color combining prism. Further, k, A4, A6, A8 and A10 denote aspheric coefficients. An aspheric surface shape is defined by the following expression where x represents a position with reference to a surface apex in the optical axis direction at a height of h from the optical axis, and R represents a curvature radius:

$$x=(h^2/R)/[1+\{1-(1+k)(h/R)^2\}^{1/2}]+A4h^4+A6h^6+A8h^8+A10h^{10}.$$

In each numerical example, "e±M" means "×10$^{\pm M}$".

Values of the above-described conditions in each embodiment are shown in Table 1.

NUMERICAL EXAMPLE 1

UNIT mm

SURFACE DATA

| SURFACE NUMBER | r | d | nd | vd | EFFECTIVE DIAMETER |
|---|---|---|---|---|---|
| 1 | 45.491 | 1.20 | 1.84666 | 23.8 | 24.11 |
| 2 | 21.920 | 4.28 | 1.59201 | 67.0 | 22.04 |
| 3 | −428.082 | 0.05 | | | 21.52 |
| 4 | 21.101 | 2.89 | 1.77250 | 49.6 | 19.85 |
| 5 | 94.188 | (VARIABLE) | | | 19.24 |
| 6 | 106.997 | 0.70 | 1.88300 | 40.8 | 14.54 |
| 7 | 8.765 | 3.41 | | | 11.56 |
| 8 | −17.734 | 0.55 | 1.81600 | 46.6 | 11.36 |
| 9 | 19.900 | 0.12 | | | 11.29 |
| 10* | 15.052 | 1.90 | 2.14352 | 17.8 | 11.47 |
| 11 | 70.000 | (VARIABLE) | | | 11.26 |
| 12 | ∞ | 8.50 | 1.83400 | 37.2 | 8.40 |
| 13 | ∞ | (VARIABLE) | | | 7.32 |
| 14* | 7.353 | 3.10 | 1.58913 | 61.1 | 8.16 |
| 15 | −31.175 | 0.24 | | | 7.50 |
| 16 | −59.294 | 0.70 | 1.74950 | 35.3 | 7.21 |
| 17 | 11.945 | 1.67 | | | 6.71 |
| 18 (APERTURE STOP) | ∞ | 4.00 | | | 6.48 |
| 19* | 10.412 | 3.58 | 1.49700 | 81.6 | 7.51 |
| 20 | −43.813 | 1.76 | | | 7.19 |
| 21 | −7.050 | 0.70 | 1.71300 | 53.9 | 6.95 |
| 22 | −14.153 | (VARIABLE) | | | 7.32 |
| 23* | 19.732 | 3.25 | 1.69350 | 53.2 | 10.24 |
| 24 | −30.172 | 0.60 | 1.84666 | 23.8 | 9.98 |
| 25 | −152.579 | (VARIABLE) | | | 9.90 |
| 26 | ∞ | 0.31 | 1.54427 | 70.6 | 20.94 |
| 27 | ∞ | 0.50 | 1.49400 | 75.0 | 20.94 |
| 28 | ∞ | 0.40 | | | 20.94 |
| 29 | ∞ | 0.50 | 1.49831 | 65.1 | 20.94 |
| 30 | ∞ | 0.12 | | | 20.94 |
| IMAGE SURFACE | ∞ | | | | |

ASPHERIC SURFACE DATA

SURFACE 10

K = −5.30134e−001    A4 = −1.20991e−005
A6 = 4.32018e−008    A8 = −1.23062e−008
A10 = 1.61310e−010

SURFACE 14

K = −3.35905e−001    A4 = −4.82963e−005
A6 = −6.54168e−007    A8 = −9.30211e−009

SURFACE 19

K = −3.30880e−001    A4 = −4.79598e−005
A6 = 2.84402e−006    A8 = −1.29374e−007
A10 = 4.96750e−009

SURFACE 23

K = −1.34241e−001    A4 = 1.69409e−006
A6 = 7.75735e−007    A8 = −2.20352e−008
A10 = 3.15210e−010

VARIOUS DATA
ZOOM RATIO 9.39

| | WIDE | MIDDLE | TELE |
|---|---|---|---|
| FOCAL LENGTH | 7.01 | 35.82 | 65.90 |
| F-NUMBER | 3.10 | 4.30 | 5.22 |
| ANGLE OF VIEW | 28.9 | 6.18 | 3.37 |
| IMAGE HEIGHT | 3.88 | 3.88 | 3.88 |
| ENTIRE LENS LENGTH | 85.6 | 85.6 | 85.6 |
| BACK FOCUS | 0.12 | 0.12 | 0.12 |
| d5 | 0.60 | 9.94 | 12.01 |
| d11 | 11.73 | 2.39 | 0.31 |
| d13 | 16.87 | 4.31 | 1.80 |
| d22 | 6.21 | 15.74 | 23.92 |
| d25 | 5.17 | 8.15 | 2.51 |
| ENTRANCE PUPIL POSITION | 21.20 | 71.80 | 98.57 |
| EXIT PUPIL POSITION | −34.78 | −140.20 | 276.17 |
| FRONT PRINCIPAL POINT POSITION | 26.81 | 98.48 | 180.20 |
| REAR PRINCIPAL POINT POSITION | −6.90 | −35.71 | −65.77 |

LENS UNIT DATA

| UNIT | FIRST SURFACE | FOCAL LENGTH | UNIT LENGTH |
|---|---|---|---|
| 1 | 1 | 27.34 | 8.41 |
| 2 | 6 | −7.86 | 6.68 |
| pr | 12 | ∞ | 8.50 |
| 3 | 14 | 19.01 | 15.75 |
| 4 | 23 | 28.14 | 3.85 |
| | 26 | ∞ | 1.71 |

| UNIT | FRONT PRINCIPAL POINT POSITION | REAR PRINCIPAL POINT POSITION |
|---|---|---|
| 1 | 2.25 | −2.82 |
| 2 | 1.12 | −3.72 |
| Pr | 2.32 | −2.32 |
| 3 | −3.05 | −13.50 |
| 4 | 0.08 | −2.17 |
| | 0.63 | −0.63 |

LENS ELEMENT DATA

| LENS ELEMENT | FIRST SURFACE | FOCAL LENGTH |
|---|---|---|
| 1 | 1 | −51.16 |
| 2 | 2 | 35.35 |
| 3 | 4 | 34.61 |
| 4 | 6 | −10.85 |
| 5 | 8 | −11.42 |
| 6 | 10 | 16.47 |
| 7 | 12 | 0.00 |
| 8 | 14 | 10.41 |
| 9 | 16 | −13.21 |
| 10 | 19 | 17.31 |
| 11 | 21 | −20.55 |
| 12 | 23 | 17.67 |
| 13 | 24 | −44.52 |
| 14 | 26 | 0.00 |
| 15 | 27 | 0.00 |
| 16 | 29 | 0.00 |

NUMERICAL EXAMPLE 2

UNIT mm

SURFACE DATA

| SURFACE NUMBER | r | d | nd | vd | EFFECTIVE DIAMETER |
|---|---|---|---|---|---|
| 1 | 41.884 | 1.20 | 1.84666 | 23.8 | 26.65 |
| 2 | 20.833 | 5.47 | 1.59201 | 67.0 | 24.30 |
| 3 | −277.257 | 0.05 | | | 23.37 |
| 4 | 20.346 | 3.20 | 1.77250 | 49.6 | 20.38 |
| 5 | 100.018 | (VARIABLE) | | | 19.74 |
| 6 | 106.955 | 0.70 | 1.88300 | 40.8 | 14.41 |
| 7 | 8.569 | 3.48 | | | 11.25 |
| 8 | −14.591 | 0.55 | 1.88300 | 40.8 | 11.00 |
| 9 | 21.803 | 0.16 | | | 11.00 |
| 10* | 16.325 | 1.93 | 2.14352 | 17.8 | 11.19 |
| 11 | 377.967 | (VARIABLE) | | | 11.06 |
| 12 | ∞ | 8.50 | 1.83400 | 37.2 | 8.40 |
| 13 | ∞ | (VARIABLE) | | | 7.22 |
| 14* | 8.183 | 2.76 | 1.69350 | 53.2 | 7.97 |
| 15 | −156.084 | 0.59 | | | 7.36 |
| 16 | ∞ | 0.61 | | | 6.93 |
| 17 | 150.002 | 0.70 | 1.80610 | 33.3 | 6.50 |
| 18 | 7.604 | 1.56 | | | 6.02 |
| 19 (APERTURE STOP) | ∞ | 0.88 | | | 6.06 |
| 20* | 17.059 | 1.93 | 1.49700 | 81.6 | 7.01 |
| 21 | −27.419 | (VARIABLE) | | | 7.18 |
| 22* | 17.766 | 2.71 | 1.69350 | 53.2 | 10.84 |
| 23 | −25.209 | 0.60 | 1.84666 | 23.8 | 10.61 |
| 24 | −296.530 | (VARIABLE) | | | 10.48 |
| 25 | ∞ | 0.31 | 1.54427 | 70.6 | 20.94 |
| 26 | ∞ | 0.50 | 1.49400 | 75.0 | 20.94 |
| 27 | ∞ | 0.40 | | | 20.94 |
| 28 | ∞ | 0.50 | 1.49831 | 65.1 | 20.94 |
| 29 | ∞ | 0.74 | | | 20.94 |
| IMAGE SURFACE | ∞ | | | | |

ASPHERIC SURFACE DATA

SURFACE 10

K = −6.83889e−001    A4 = −1.74588e−005
A6 = 9.12125e−008    A8 = −1.91282e−008
A10 = 2.60759e−010

SURFACE 14

K = −3.25539e−001    A4 = −3.65995e−005
A6 = −4.25045e−007   A8 = 8.37541e−010

SURFACE 20

K = −1.63218e+000    A4 = −3.18974e−005
A6 = 2.69537e−006    A8 = −2.51783e−007
A10 = 8.99540e−009

SURFACE 22

K = 1.87341e−001     A4 = 1.91454e−005
A6 = −3.21895e−008   A8 = 7.84140e−009
A10 = −1.51657e−010

VARIOUS DATA
ZOOM RATIO 9.40

| | WIDE | MIDDLE | TELE |
|---|---|---|---|
| FOCAL LENGTH | 7.01 | 21.57 | 65.96 |
| F-NUMBER | 3.10 | 3.89 | 5.18 |
| ANGLE OF VIEW | 29.4 | 10.2 | 3.37 |
| IMAGE HEIGHT | 3.88 | 3.88 | 3.88 |
| ENTIRE LENS LENGTH | 87.7 | 87.7 | 87.7 |
| BACK FOCUS | 0.74 | 0.74 | 0.74 |
| d5 | 0.60 | 6.72 | 10.64 |
| d11 | 10.35 | 4.22 | 0.30 |
| d13 | 17.12 | 7.30 | 1.80 |
| d21 | 13.24 | 20.99 | 33.03 |
| d24 | 6.36 | 8.39 | 1.87 |
| ENTRANCE PUPIL POSITION | 22.97 | 53.58 | 104.90 |
| EXIT PUPIL POSITION | −44.21 | −150.70 | 126.82 |
| FRONT PRINCIPAL POINT POSITION | 28.89 | 72.07 | 205.37 |
| REAR PRINCIPAL POINT POSITION | −6.27 | −20.83 | −65.22 |

LENS UNIT DATA

| UNIT | FIRST SURFACE | FOCAL LENGTH | UNIT LENGTH |
|---|---|---|---|
| 1 | 1 | 25.10 | 9.92 |
| 2 | 6 | −7.35 | 6.82 |
| pr | 12 | ∞ | 8.50 |
| 3 | 14 | 21.00 | 9.03 |
| 4 | 22 | 27.79 | 3.31 |
| | 25 | ∞ | 1.71 |

| UNIT | FRONT PRINCIPAL POINT POSITION | REAR PRINCIPAL POINT POSITION |
|---|---|---|
| 1 | 2.89 | −3.16 |
| 2 | 1.11 | −3.91 |
| Pr | 2.32 | −2.32 |
| 3 | 0.27 | −7.70 |
| 4 | −0.12 | −2.03 |
| | 0.63 | −0.63 |

LENS ELEMENT DATA

| LENS ELEMENT | FIRST SURFACE | FOCAL LENGTH |
|---|---|---|
| 1 | 1 | −50.27 |
| 2 | 2 | 32.96 |
| 3 | 4 | 32.50 |
| 4 | 6 | −10.59 |
| 5 | 8 | −9.83 |
| 6 | 10 | 14.88 |
| 7 | 12 | 0.00 |
| 8 | 14 | 11.29 |
| 9 | 17 | −9.96 |
| 10 | 20 | 21.47 |
| 11 | 22 | 15.43 |
| 12 | 23 | −32.57 |
| 13 | 25 | 0.00 |
| 14 | 26 | 0.00 |
| 15 | 28 | 0.00 |

NUMERICAL EXAMPLE 3

UNIT mm

SURFACE DATA

| SURFACE NUMBER | r | d | nd | vd | EFFECTIVE DIAMETER |
|---|---|---|---|---|---|
| 1 | 69.849 | 1.23 | 1.84666 | 23.8 | 34.96 |
| 2 | 35.896 | 7.12 | 1.49700 | 81.5 | 34.05 |
| 3 | −264.127 | 0.05 | | | 33.82 |
| 4 | 31.080 | 4.18 | 1.77250 | 49.6 | 32.72 |
| 5 | 97.197 | (VARIABLE) | | | 32.17 |
| 6 | 48.513 | 0.72 | 1.88300 | 40.8 | 17.12 |
| 7 | 10.385 | 4.13 | | | 13.86 |
| 8 | −20.090 | 0.56 | 1.77250 | 49.6 | 13.62 |
| 9 | 19.881 | 0.01 | | | 13.35 |

-continued

UNIT mm

| | | | | | |
|---|---|---|---|---|---|
| 10* | 13.218 | 2.00 | 2.14352 | 17.8 | 13.58 |
| 11 | 30.000 | (VARIABLE) | | | 13.23 |
| 12 | ∞ | 8.71 | 1.83400 | 37.2 | 7.62 |
| 13 | ∞ | (VARIABLE) | | | 6.65 |
| 14* | 7.947 | 3.29 | 1.58913 | 61.1 | 9.01 |
| 15 | −48.570 | 0.05 | | | 8.39 |
| 16 | 71.006 | 0.72 | 1.74950 | 35.3 | 8.15 |
| 17 | 9.442 | 1.99 | | | 7.55 |
| 18 (APERTURE STOP) | ∞ | 3.61 | | | 7.41 |
| 19* | 10.385 | 3.70 | 1.45650 | 90.3 | 8.47 |
| 20 | −67.109 | 5.94 | | | 8.23 |
| 21 | −7.573 | 0.55 | 1.58913 | 61.1 | 7.50 |
| 22 | −48.018 | (VARIABLE) | | | 7.96 |
| 23* | 24.190 | 4.20 | 1.69350 | 53.2 | 11.17 |
| 24 | −12.383 | 0.61 | 1.84666 | 23.8 | 11.25 |
| 25 | −20.531 | (VARIABLE) | | | 11.40 |
| 26 | ∞ | 0.32 | 1.54427 | 70.6 | 21.46 |
| 27 | ∞ | 0.51 | 1.49400 | 75.0 | 21.46 |
| 28 | ∞ | 0.41 | | | 21.46 |
| 29 | ∞ | 0.51 | 1.49831 | 65.1 | 21.46 |
| 30 | ∞ | 0.11 | | | 21.46 |
| IMAGE SURFACE | ∞ | | | | |

ASPHERIC SURFACE DATA

SURFACE 10

K = −7.60271e−001   A4 = −2.14965e−005
A6 = −8.27907e−008  A8 = −1.85857e−009
A10 = 2.38955e−011

SURFACE 14

K = −3.81331e−001   A4 = −6.18891e−005
A6 = −6.15089e−007  A8 = −1.05099e−008

SURFACE 19

K = −3.53354e−001   A4 = −4.79216e−005
A6 = 2.24978e−008   A8 = 1.03870e−008
A10 = 7.88194e−011

SURFACE 23

K = −1.63549e+000   A4 = −1.48372e−005
A6 = −3.23057e−008  A8 = 6.95691e−009
A10 = −1.44518e−010

VARIOUS DATA
ZOOM RATIO 19.17

| | WIDE | MIDDLE | TELE |
|---|---|---|---|
| FOCAL LENGTH | 6.41 | 16.54 | 122.84 |
| F-NUMBER | 3.11 | 3.86 | 6.47 |
| ANGLE OF VIEW | 31.2 | 13.2 | 1.81 |
| IMAGE HEIGHT | 3.88 | 3.88 | 3.88 |
| ENTIRE LENS LENGTH | 105.3 | 101.1 | 106.5 |
| BACK FOCUS | 0.11 | 0.11 | 0.11 |
| d5 | 0.62 | 10.95 | 27.64 |
| d11 | 26.50 | 12.02 | 0.75 |
| d13 | 15.43 | 6.19 | 1.30 |
| d22 | 4.91 | 7.55 | 19.22 |
| d25 | 2.57 | 9.16 | 2.39 |
| ENTRANCE PUPIL POSITION | 25.41 | 54.63 | 268.27 |
| EXIT PUPIL POSITION | −65.67 | −206.91 | 45.34 |
| FRONT PRINCIPAL POINT POSITION | 31.19 | 69.85 | 724.79 |
| REAR PRINCIPAL POINT POSITION | −6.29 | −16.42 | −122.73 |

LENS UNIT DATA

| UNIT | FIRST SURFACE | FOCAL LENGTH | UNIT LENGTH |
|---|---|---|---|
| 1 | 1 | 46.71 | 12.58 |
| 2 | 6 | −9.59 | 7.42 |
| pr | 12 | ∞ | 8.71 |
| 3 | 14 | 19.20 | 19.84 |

-continued

UNIT mm

| | | | |
|---|---|---|---|
| 4 | 23 | 18.10 | 4.81 |
| 26 | ∞ | | 1.75 |

| UNIT | FRONT PRINCIPAL POINT POSITION | REAR PRINCIPAL POINT POSITION |
|---|---|---|
| 1 | 3.77 | −4.09 |
| 2 | 1.89 | −3.39 |
| Pr | 2.38 | −2.38 |
| 3 | −12.58 | −17.01 |
| 4 | 1.55 | −1.39 |
| | 0.65 | −0.65 |

LENS ELEMENT DATA

| LENS ELEMENT | FIRST SURFACE | FOCAL LENGTH |
|---|---|---|
| 1 | 1 | −88.69 |
| 2 | 2 | 64.09 |
| 3 | 4 | 57.56 |
| 4 | 6 | −15.10 |
| 5 | 8 | −12.86 |
| 6 | 10 | 19.43 |
| 7 | 12 | 0.00 |
| 8 | 14 | 11.85 |
| 9 | 16 | −14.60 |
| 10 | 19 | 20.00 |
| 11 | 21 | −15.34 |
| 12 | 23 | 12.39 |
| 13 | 24 | −38.18 |
| 14 | 26 | 0.00 |
| 15 | 27 | 0.00 |
| 16 | 29 | 0.00 |

NUMERICAL EXAMPLE 4

UNIT mm

SURFACE DATA

| SURFACE NUMBER | r | d | nd | vd | EFFECTIVE DIAMETER |
|---|---|---|---|---|---|
| 1 | 44.228 | 1.25 | 1.84666 | 23.8 | 24.95 |
| 2 | 22.500 | 4.19 | 1.59201 | 67.0 | 23.24 |
| 3 | 2310.573 | 0.08 | | | 23.05 |
| 4 | 21.848 | 3.22 | 1.77250 | 49.6 | 22.12 |
| 5 | 85.910 | (VARIABLE) | | | 21.52 |
| 6 | 220.500 | 0.75 | 1.88300 | 40.8 | 14.57 |
| 7 | 7.958 | 3.52 | | | 11.31 |
| 8 | −18.581 | 1.00 | 1.77250 | 49.6 | 11.18 |
| 9* | 24.744 | 0.05 | | | 11.28 |
| 10 | 16.939 | 1.69 | 1.94595 | 18.0 | 11.46 |
| 11 | −2909.835 | (VARIABLE) | | | 11.38 |
| 12 | ∞ | 8.75 | 1.83400 | 37.2 | 7.87 |
| 13 | ∞ | (VARIABLE) | | | 6.70 |
| 14 | −26.638 | 0.50 | 1.48749 | 70.2 | 6.45 |
| 15 | −39.154 | (VARIABLE) | | | 6.42 |
| 16* | 8.112 | 4.40 | 1.58913 | 61.1 | 8.58 |
| 17 | −23.834 | 0.22 | | | 7.72 |
| 18 | −38.340 | 0.55 | 1.74950 | 35.3 | 7.47 |
| 19 | 12.652 | 1.73 | | | 7.10 |
| 20 (APERTURE STOP) | ∞ | 2.59 | | | 7.00 |
| 21* | 11.294 | 2.95 | | | 7.87 |
| 22 | −40.238 | 2.81 | | | 7.76 |
| 23 | −6.981 | 0.55 | 1.74320 | 49.3 | 7.43 |
| 24 | −9.851 | (VARIABLE) | | | 7.78 |
| 25* | 24.403 | 2.24 | 1.69350 | 53.2 | 9.70 |

-continued

UNIT mm

| | | | | | |
|---|---|---|---|---|---|
| 26 | −44.974 | 0.55 | 1.84666 | 23.9 | 9.54 |
| 27 | −685.458 | (VARIABLE) | | | 9.48 |
| 28 | ∞ | 0.32 | | | 21.46 |
| 29 | ∞ | 0.30 | 1.49400 | 75.0 | 21.46 |
| 30 | ∞ | 0.00 | | | 21.46 |
| 31 | ∞ | 0.50 | 1.51633 | 64.1 | 21.46 |
| 32 | ∞ | 0.13 | | | 21.46 |
| IMAGE SURFACE | ∞ | | | | |

ASPHERIC SURFACE DATA

SURFACE 9

K = −2.09342e−001    A4 = −5.18165e−006
A6 = 1.30510e−008    A8 = 1.58950e−008
A10 = −2.21254e−010

SURFACE 16

K = −3.46233e−001    A4 = −4.22096e−005
A6 = −5.05679e−007   A8 = −7.39445e−009

SURFACE 21

K = −4.85800e−001    A4 = −6.15558e−005
A6 = 9.22907e−007    A8 = 2.71895e−008
A10 = 2.63699e−010

SURFACE 25

K = 1.02828e+000     A4 = 6.47868e−006
A6 = −1.28150e−007   A8 = 1.09553e−008
A10 = −2.10989e−010

VARIOUS DATA
ZOOM RATIO 9.48

| | WIDE | MIDDLE | TELE |
|---|---|---|---|
| FOCAL LENGTH | 6.73 | 23.07 | 63.78 |
| F-NUMBER | 3.10 | 4.37 | 5.71 |
| ANGLE OF VIEW | 30.0 | 9.57 | 3.48 |
| IMAGE HEIGHT | 3.88 | 3.88 | 3.88 |
| ENTIRE LENS LENGTH | 88.8 | 88.8 | 88.8 |
| BACK FOCUS | 0.13 | 0.13 | 0.13 |
| d5 | 0.78 | 8.82 | 14.04 |
| d11 | 14.08 | 6.04 | 0.81 |
| d13 | 1.20 | 1.20 | 1.20 |
| d15 | 13.50 | 3.21 | 0.50 |
| d24 | 10.66 | 15.45 | 24.26 |
| d27 | 3.72 | 9.20 | 3.12 |
| d32 | 0.13 | 0.13 | 0.13 |
| ENTRANCE PUPIL POSITION | 20.67 | 54.58 | 120.37 |
| EXIT PUPIL POSITION | −39.46 | −66.95 | −183.66 |
| FRONT PRINCIPAL POINT POSITION | 26.25 | 69.72 | 162.02 |
| REAR PRINCIPAL POINT POSITION | −6.59 | −22.94 | −63.65 |

LENS UNIT DATA

| UNIT | FIRST SURFACE | FOCAL LENGTH | UNIT LENGTH |
|---|---|---|---|
| 1 | 1 | 29.53 | 8.74 |
| 2 | 6 | −7.89 | 7.02 |
| pr | 12 | ∞ | 8.75 |
| 3 | 14 | −173.21 | 0.50 |
| 4 | 16 | 18.13 | 15.80 |
| 5 | 25 | 37.99 | 2.79 |
| | 28 | ∞ | 1.12 |

| UNIT | FRONT PRINCIPAL POINT POSITION | REAR PRINCIPAL POINT POSITION |
|---|---|---|
| 1 | 1.98 | −3.27 |
| 2 | 0.72 | −4.64 |
| Pr | 2.39 | −2.39 |
| 3 | −0.72 | −1.07 |
| 4 | −0.27 | −12.65 |
| 5 | −0.10 | −1.71 |
| | 0.42 | −0.42 |

-continued

UNIT mm

LENS ELEMENT DATA

| LENS ELEMENT | FIRST SURFACE | FOCAL LENGTH |
|---|---|---|
| 1 | 1 | −55.56 |
| 2 | 2 | 38.35 |
| 3 | 4 | 37.11 |
| 4 | 6 | −9.37 |
| 5 | 8 | −13.60 |
| 6 | 10 | 17.81 |
| 7 | 12 | 0.00 |
| 8 | 14 | −173.21 |
| 9 | 16 | 10.83 |
| 10 | 18 | −12.63 |
| 11 | 21 | 18.08 |
| 12 | 23 | −35.11 |
| 13 | 25 | 23.12 |
| 14 | 26 | −56.87 |
| 15 | 29 | 0.00 |
| 16 | 31 | 0.00 |

NUMERICAL EXAMPLE 5

UNIT mm

SURFACE DATA

| SURFACE NUMBER | r | d | nd | vd | EFFECTIVE DIAMETER |
|---|---|---|---|---|---|
| 1 | 47.940 | 1.20 | 1.84666 | 23.8 | 27.53 |
| 2 | 23.137 | 5.05 | 1.59240 | 68.3 | 26.35 |
| 3 | −259.356 | 0.05 | | | 26.23 |
| 4 | 21.007 | 4.05 | 1.77250 | 49.6 | 24.57 |
| 5 | 87.358 | (VARIABLE) | | | 23.84 |
| 6 | 71.299 | 0.70 | 1.88300 | 40.8 | 14.62 |
| 7 | 8.213 | 3.67 | | | 11.31 |
| 8 | −14.347 | 0.70 | 1.88300 | 40.8 | 11.07 |
| 9 | 23.448 | 0.05 | | | 11.11 |
| 10* | 16.390 | 1.95 | 2.14352 | 17.8 | 11.27 |
| 11 | 723.372 | (VARIABLE) | | | 11.14 |
| 12 | ∞ | 8.50 | 1.83400 | 37.2 | 8.27 |
| 13 | ∞ | (VARIABLE) | | | 7.18 |
| 14 | 100.000 | 1.00 | 1.83400 | 37.2 | 7.49 |
| 15 | 39.837 | 2.93 | | | 7.65 |
| 16* | 8.475 | 2.80 | 1.65100 | 56.2 | 8.07 |
| 17 | −199.396 | 1.04 | | | 7.94 |
| 18 | 24.325 | 0.70 | 1.80610 | 33.3 | 7.73 |
| 19 | 8.059 | 0.62 | | | 7.43 |
| 20* | 23.985 | 1.98 | 1.49700 | 81.6 | 7.43 |
| 21 | −24.828 | (VARIABLE) | | | 7.69 |
| 22* | 13.596 | 2.67 | 1.51633 | 64.1 | 10.01 |
| 23 | −38.595 | 0.60 | 1.84666 | 23.8 | 9.76 |
| 24 | 1059.708 | (VARIABLE) | | | 9.66 |
| 25 | ∞ | 0.31 | 1.54427 | 70.6 | 20.94 |
| 26 | ∞ | 0.50 | 1.49400 | 75.0 | 20.94 |
| 27 | ∞ | 0.40 | | | 20.94 |
| 28 | ∞ | 0.50 | 1.49831 | 65.1 | 20.94 |
| 29 | ∞ | 0.22 | | | 20.94 |
| IMAGE SURFACE | ∞ | | | | |

ASPHERIC SURFACE DATA

SURFACE 10

K = −8.67091e−001    A4 = −2.07518e−005
A6 = 1.42567e−007    A8 = −2.52900e−008
A10 = 3.48108e−010

-continued

UNIT mm

SURFACE 16

K = -4.48898e-001    A4 = -7.59908e-005
A6 = -2.63291e-007   A8 = -8.45311e-009

SURFACE 20

K = 4.22377e-001     A4 = 3.44407e-006
A6 = 2.43684e-007    A8 = 5.78953e-008

SURFACE 22

K = 1.22038e-001     A4 = -1.60158e-006
A6 = 2.33052e-006    A8 = -9.37529e-008
A10 = 1.44928e-009

VARIOUS DATA
ZOOM RATIO 7.67

|  | WIDE | MIDDLE | TELE |
|---|---|---|---|
| FOCAL LENGTH | 7.00 | 20.15 | 53.74 |
| F-NUMBER | 3.11 | 3.71 | 4.44 |
| ANGLE OF VIEW | 29.0 | 10.9 | 4.13 |
| IMAGE HEIGHT | 3.88 | 3.88 | 3.88 |
| ENTIRE LENS LENGTH | 88.4 | 88.4 | 88.4 |
| BACK FOCUS | 0.22 | 0.22 | 0.22 |
| d5 | 0.60 | 7.26 | 11.71 |
| d11 | 11.42 | 4.73 | 0.30 |
| d13 | 13.03 | 5.45 | 2.80 |
| d21 | 13.55 | 19.47 | 28.93 |
| d24 | 7.66 | 9.28 | 2.45 |
| ENTRANCE PUPIL POSITION | 22.83 | 53.24 | 107.11 |
| EXIT PUPIL POSITION | -50.33 | -94.79 | -1825.34 |
| FRONT PRINCIPAL POINT POSITION | 28.86 | 69.12 | 159.27 |
| REAR PRINCIPAL POINT POSITION | -6.79 | -19.93 | -53.52 |

LENS UNIT DATA

| UNIT | FIRST SURFACE | FOCAL LENGTH | UNIT LENGTH |
|---|---|---|---|
| 1 | 1 | 27.10 | 10.35 |
| 2 | 6 | -7.48 | 7.07 |
| pr | 12 | ∞ | 8.50 |
| 3 | 14 | 20.58 | 11.07 |
| 4 | 22 | 34.18 | 3.27 |
|  | 25 | ∞ | 1.71 |

| UNIT | FRONT PRINCIPAL POINT POSITION | REAR PRINCIPAL POINT POSITION |
|---|---|---|
| 1 | 2.53 | -3.66 |
| 2 | 1.13 | -4.04 |
| Pr | 2.32 | -2.32 |
| 3 | 3.52 | -5.08 |
| 4 | -0.57 | -2.62 |
|  | 0.63 | -0.63 |

LENS ELEMENT DATA

| LENS ELEMENT | FIRST SURFACE | FOCAL LENGTH |
|---|---|---|
| 1 | 1 | -54.02 |
| 2 | 2 | 36.10 |
| 3 | 4 | 34.88 |
| 4 | 6 | -10.57 |
| 5 | 8 | -9.99 |
| 6 | 10 | 14.64 |
| 7 | 12 | 0.00 |
| 8 | 14 | -80.00 |
| 9 | 16 | 12.55 |
| 10 | 18 | -15.24 |
| 11 | 20 | 24.88 |
| 12 | 22 | 19.82 |
| 13 | 23 | -43.97 |
| 14 | 25 | 0.00 |
| 15 | 26 | 0.00 |
| 16 | 28 | 0.00 |

NUMERICAL EXAMPLE 6

UNIT mm

SURFACE DATA

| SURFACE NUMBER | r | d | nd | vd | EFFECTIVE DIAMETER |
|---|---|---|---|---|---|
| 1 | 43.277 | 1.25 | 1.84666 | 23.8 | 23.45 |
| 2 | 22.500 | 3.68 | 1.59201 | 67.0 | 22.40 |
| 3 | 331.179 | 0.08 |  |  | 22.21 |
| 4 | 22.316 | 3.01 | 1.77250 | 49.6 | 21.43 |
| 5 | 87.317 | (VARIABLE) |  |  | 20.88 |
| 6 | 237.841 | 1.00 | 1.84862 | 40.0 | 13.92 |
| 7* | 7.366 | 3.22 |  |  | 10.52 |
| 8 | -16.992 | 0.75 | 1.77250 | 49.6 | 10.44 |
| 9 | 26.851 | 0.05 |  |  | 10.55 |
| 10 | 16.206 | 1.59 | 1.94595 | 18.0 | 10.73 |
| 11 | -893.871 | (VARIABLE) |  |  | 10.64 |
| 12 | ∞ | 8.75 | 1.83400 | 37.2 | 7.97 |
| 13 | ∞ | (VARIABLE) |  |  | 6.77 |
| 14 | -35.429 | 0.50 | 1.48749 | 70.2 | 6.51 |
| 15 | -61.631 | (VARIABLE) |  |  | 6.45 |
| 16* | 7.870 | 3.04 | 1.58913 | 61.1 | 8.29 |
| 17 | -32.010 | 0.16 |  |  | 7.81 |
| 18 | -161.853 | 0.55 | 1.80610 | 33.3 | 7.59 |
| 19 | 13.438 | 1.72 |  |  | 7.25 |
| 20 (APERTURE STOP) | ∞ | 4.11 |  |  | 7.10 |
| 21* | 11.385 | 2.95 |  |  | 7.84 |
| 22 | -41.230 | 2.73 |  |  | 7.67 |
| 23 | -7.583 | 0.55 | 1.74320 | 49.3 | 7.30 |
| 24 | -12.362 | (VARIABLE) |  |  | 7.62 |
| 25* | 22.329 | 2.49 | 1.69350 | 53.2 | 9.81 |
| 26 | -45.027 | 0.55 | 1.84666 | 23.9 | 9.62 |
| 27 | -10000.000 | (VARIABLE) |  |  | 9.56 |
| IMAGE SURFACE | ∞ |  |  |  |  |

ASPHERIC SURFACE DATA

SURFACE 7

K = -1.96634e-002    A4 = 6.95999e-006
A6 = -7.39743e-008   A8 = 1.55845e-008
A10 = 4.92660e-010

SURFACE 16

K = -4.12650e-001    A4 = -5.17406e-005
A6 = -7.18644e-007   A8 = -6.23045e-010

SURFACE 21

K = -4.05809e-001    A4 = -5.39304e-005
A6 = 1.49263e-006    A8 = -4.14950e-008
A10 = 1.77160e-009

SURFACE 25

K = 7.32690e-001     A4 = 5.83938e-006
A6 = -8.36645e-007   A8 = 3.72222e-008
A10 = -5.21415e-010

VARIOUS DATA
ZOOM RATIO 9.42

|  | WIDE | MIDDLE | TELE |
|---|---|---|---|
| FOCAL LENGTH | 6.69 | 17.67 | 63.04 |
| F-NUMBER | 3.10 | 3.88 | 5.64 |
| ANGLE OF VIEW | 30.08 | 12.37 | 3.52 |
| IMAGE HEIGHT | 3.88 | 3.88 | 3.88 |
| ENTIRE LENS LENGTH | 83.11 | 84.01 | 88.64 |
| BACK FOCUS | 4.60 | 10.16 | 4.03 |
| d5 | 0.74 | 7.15 | 15.28 |
| d11 | 9.84 | 4.32 | 0.81 |

-continued

UNIT mm

| | | | |
|---|---|---|---|
| d13 | 1.20 | 1.20 | 1.20 |
| d15 | 14.28 | 4.87 | 0.50 |
| d24 | 9.74 | 13.60 | 24.11 |
| d27 | 4.60 | 10.16 | 4.03 |
| ENTRANCE PUPIL POSITION | 18.98 | 39.15 | 119.09 |
| EXIT PUPIL POSITION | −36.83 | −55.88 | −304.36 |
| FRONT PRINCIPAL POINT POSITION | 24.59 | 52.09 | 169.24 |
| REAR PRINCIPAL POINT POSITION | −2.09 | −7.51 | −59.01 |

LENS UNIT DATA

| UNIT | FIRST SURFACE | FOCAL LENGTH | UNIT LENGTH |
|---|---|---|---|
| 1 | 1 | 31.07 | 8.02 |
| 2 | 6 | −7.78 | 6.60 |
| PR | 12 | ∞ | 8.75 |
| 3 | 14 | −172.02 | 0.50 |
| 4 | 16 | 17.32 | 15.80 |
| 5 | 25 | 35.85 | 3.04 |

| UNIT | FRONT PRINCIPAL POINT POSITION | REAR PRINCIPAL POINT POSITION |
|---|---|---|
| 1 | 1.64 | −3.15 |
| 2 | 0.78 | −4.25 |
| Pr | 2.39 | −2.39 |
| 3 | −0.46 | −0.80 |
| 4 | −0.42 | −12.63 |
| 5 | −0.17 | −1.93 |

LENS ELEMENT DATA

| LENS ELEMENT | FIRST SURFACE | FOCAL LENGTH |
|---|---|---|
| 1 | 1 | −56.92 |
| 2 | 2 | 40.60 |
| 3 | 4 | 38.04 |
| 4 | 6 | −8.98 |
| 5 | 8 | −13.37 |
| 6 | 10 | 16.84 |
| 7 | 12 | 0.00 |
| 8 | 14 | −172.02 |
| 9 | 16 | 11.03 |
| 10 | 18 | −15.37 |
| 11 | 21 | 18.29 |
| 12 | 23 | −27.76 |
| 13 | 25 | 21.85 |
| 14 | 26 | −53.42 |

TABLE 1

| | CONDITION | | | | | |
|---|---|---|---|---|---|---|
| | (1) $(1-\beta b)\beta r$ | (2) $Lb/Lp$ | (3) $fr/\sqrt{fw \cdot ft}$ | (4) $fstr/fw$ | (5) $fb/fT$ | (6) $(Lp + Lb)/\Phi 2r$ |
| NUMERICAL EXAMPLE | | | | | | |
| 1 | 1.87 | 1.35 | 1.55 | 2.71 | 0.26 | 1.77 |
| 2 | 1.51 | 1.05 | 1.29 | 3.00 | 0.33 | 1.57 |
| 3 | 1.84 | 1.26 | 0.54 | 3.00 | 0.16 | 1.49 |
| 4 | 1.83 | 1.34 | 2.85 | 2.70 | 0.28 | 1.79 |
| 5 | 2.03 | 0.79 | 1.76 | 2.94 | 0.31 | 1.37 |
| 6 | 1.83 | 1.35 | 2.90 | 2.59 | 0.29 | 1.93 |

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2009-155081, filed on Jun. 30, 2009, which is hereby incorporated by reference herein in its entirety.

What is claimed is:

1. A zoom lens comprising in order from an object side to an image side:
a first lens unit configured to have a positive refractive power;
a second lens unit configured to have a negative refractive power;
a reflective member configured to bend an optical axis; and
subsequent lens units;
wherein a distance between the second lens unit and the subsequent lens units is reduced during zooming from a wide-angle end to a telephoto end,
wherein one of the subsequent lens units is configured to include, in order from the object side to the image side, a non-shift lens unit that is unmoved during image stabilization, and a shift lens unit that is moved in a direction including a directional component orthogonal to an optical axis direction to change an image-forming position in a direction orthogonal to the optical axis direction during the image stabilization, and
wherein the following conditions are satisfied:

$$1<(1-\beta b)\beta r<3$$

$$0.70<Lb/Lp<2.00$$

where $\beta b$ and $\beta r$ respectively represent a lateral magnification of the shift lens unit and a total lateral magnification of all lens units disposed further on the image side than the shift lens unit when the zoom lens is focused on an infinitely distant object at the telephoto end, Lb represents a distance from an image side surface of the reflective member to an object side lens surface of the shift lens unit when the zoom lens is focused on the infinitely distant object at the telephoto end, and Lp represents a thickness of the reflective member on the optical axis.

2. A zoom lens according to claim 1, wherein the subsequent lens units are configured to include plural lens units each having a positive refractive power,
wherein in the zoom lens at least three lens units are moved in the optical axis direction during zooming, and
wherein the following condition is satisfied:

$$0.1<fr/\sqrt{(fw \cdot ft)}<4.0$$

where fr represents a focal length of the all lens units disposed further on the image side than the shift lens unit when the zoom lens is focused on the infinitely distant object at the telephoto end, and fw and ft respectively represent focal lengths of the entire zoom lens at the wide-angle end and at the telephoto end.

3. A zoom lens according to claim 1, wherein the following condition is satisfied:

$$1.0<fstr/fw<3.2$$

where fstr represents a focal length of a lens unit whose movement amount in the optical axis direction during zooming is largest in the subsequent lens units, and fw represents a focal length of the entire zoom lens at the wide-angle end.

4. A zoom lens according to claim 1, wherein the following condition is satisfied:

$$0.1<fb/ft<0.5$$

where fb represents a focal length of the shift lens unit, and ft represents a focal length of the entire zoom lens at the telephoto end.

5. A zoom lens according to claim 1, wherein the reflective member configured to include a reflective surface reflecting a light ray on the optical axis by 90 degrees with respect to an incident direction of the light ray incident on the reflective surface, and wherein the following condition is satisfied:

$$0.7<(Lp+Lb)/\phi 2r<3.0$$

where $\phi 2r$ represents an effective diameter of an image side lens surface of the second lens unit.

6. An image pickup apparatus comprising:
a zoom lens according to claim 1; and
an image pickup element configured to photoelectrically convert an object image formed by the zoom lens.

* * * * *